United States Patent
Kim et al.

(10) Patent No.: US 12,466,319 B2
(45) Date of Patent: Nov. 11, 2025

(54) APPARATUS FOR OPERATING MIRROR ASSEMBLY OF VEHICLE COMPRISING A DRIVING GEAR DISPOSED COAXIALLY WITH A DETENT MEMBER

(71) Applicant: SL Mirrortech Corporation, Siheung-si (KR)

(72) Inventors: Yong Hwan Kim, Siheung-si (KR); Yong Hei Kim, Siheung-si (KR); Yeong Kook Cho, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 430 days.

(21) Appl. No.: 18/158,292

(22) Filed: Jan. 23, 2023

(65) Prior Publication Data

US 2023/0347824 A1    Nov. 2, 2023

(30) Foreign Application Priority Data

Mar. 29, 2022 (KR) .......................... 10-2022-0039034

(51) Int. Cl.
*B60R 1/074* (2006.01)
*G02B 7/182* (2021.01)

(52) U.S. Cl.
CPC .............. *B60R 1/074* (2013.01); *G02B 7/182* (2013.01)

(58) Field of Classification Search
CPC  B60R 1/25; B60R 1/006; B60R 1/072; B60R 1/07; B60R 1/0617
See application file for complete search history.

(56) References Cited

U.S. PATENT DOCUMENTS

| | | | | |
|---|---|---|---|---|
| 2018/0086272 A1* | 3/2018 | De Wind | ................... | B60R 1/07 |
| 2019/0118715 A1* | 4/2019 | Salter | ...................... | B60R 1/074 |
| 2019/0359137 A1* | 11/2019 | Yoshida | ................... | B60R 1/074 |
| 2020/0331391 A1* | 10/2020 | Scott-Collins | .......... | F16C 11/12 |
| 2020/0331394 A1* | 10/2020 | Schnellbach | ......... | B60R 1/1207 |

FOREIGN PATENT DOCUMENTS

| | | | | | |
|---|---|---|---|---|---|
| CN | 111002907 A | * | 4/2020 | | |
| CN | 111746403 A | * | 10/2020 | ............ | B60J 5/0404 |

* cited by examiner

*Primary Examiner* — Paul C Lee
(74) *Attorney, Agent, or Firm* — United One Law Group LLC; Kongsik Kim; Jhongwoo Peck

(57) ABSTRACT

An apparatus for operating a mirror assembly of a vehicle includes a fixing member fixed to a mirror base of the vehicle; and a driving member fixed to a mirror housing of the vehicle and configured to rotate the mirror housing with respect to the fixing member by generating a driving force. A position of the mirror housing includes a first position where the mirror housing is unfolded with respect to the mirror base and a second position where the mirror housing is folded with respect to the mirror base. The driving member is configured to decrease a gap between the mirror housing and the mirror base when the mirror housing is changed from the second position to the first position, and increase the gap when the mirror housing is changed from the first position to the second position.

16 Claims, 37 Drawing Sheets

APPARATUS FOR OPERATING MIRROR ASSEMBLY OF VEHICLE COMPRISING A DRIVING GEAR DISPOSED COAXIALLY WITH A DETENT MEMBER

CROSS-REFERENCE TO RELATED APPLICATION

This application claims priority from Korean Patent Application No. 10-2022-0039034 filed on Mar. 29, 2022, which is incorporated herein by reference in its entirety.

BACKGROUND

1. Technical Field

The present disclosure relates to an apparatus for a vehicle, and more particularly, to an apparatus for operating a mirror assembly of a vehicle that adjusts a gap between a mirror housing and a mirror base provided in the vehicle.

2. Description of the Related Art

Inside a vehicle, an inside mirror is installed so that a driver can grasp the rear situation of the vehicle, while outside mirrors are installed on both sides of the vehicle so that the driver can grasp the rear side situation of the vehicle. The driver can identify the surrounding vehicles or pedestrians, back up the vehicle, pass another vehicle, and change lanes aided by the field of view secured by the inside mirror or the outside mirrors.

Recently, in order to reduce air resistance as well as to reduce the possibility of damages caused by external impacts, a camera mirror including a camera has been applied instead of the outside mirror. Since the surrounding image of the vehicle acquired by the camera mirror is displayed through a display device inside the vehicle, the driver can easily grasp the surrounding situation.

When operating a vehicle, the outside mirror or the camera mirror remains unfolded so that the driver can gasp the surrounding situation. On the other hand, when the vehicle is parked or passing through a narrow space, it is necessary to fold the outside mirror or camera mirror towards the vehicle to avoid damages to the outside mirror or camera mirror or to secure the surrounding space. In such case, the driver can rotate the outside mirror or camera mirror by using an actuator or manually.

SUMMARY

Aspects of the present disclosure provide an apparatus for a vehicle that allows adjusting a gap between a mirror housing and a base provided in the vehicle while folding or unfolding the mirror housing.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an aspect of the present disclosure, an apparatus for operating a mirror assembly of a vehicle may include a fixing member fixed to a mirror base of the vehicle; and a driving member fixed to a mirror housing of the vehicle and configured to rotate the mirror housing with respect to the fixing member by generating a driving force. A position of the mirror housing includes a first position where the mirror housing is unfolded with respect to the mirror base or a second position where the mirror housing is folded with respect to the mirror base, and the driving member may be configured to decrease a gap between the mirror housing and the mirror base when the mirror housing is changed from the second position to the first position, and increase the gap when the mirror housing is changed from the first position to the second position.

In particular, the driving member may include a drive body coupled to the fixing member and fixed to the mirror housing; a driving motor for generating the driving force to rotate the drive body with respect to the fixing member; a detent member coupled to the fixing member to move in a direction parallel to a rotation axis of the mirror housing and prevented from rotating with respect to the fixing member, the detent member including at least one detent groove; and a driving gear disposed coaxially with the detent member along the direction parallel to the rotation axis of the mirror housing for receiving the driving force from the driving motor, the driving gear including at least one detent protrusion capable of being inserted into the detent groove.

A protrusion support may be formed at a bottom corner of the detent groove and be configured to support the detent protrusion in a state that the detent protrusion is separated from a bottom surface of the detent groove by a predetermined distance. The detent protrusion may be supported by the protrusion support by a rotation of the driving gear with respect to the detent member, or supported by the bottom surface of the detent groove when released from the protrusion support.

The driving member may further include an elastic member configured to generate an elastic force to push the driving gear toward the detent member, and when the detent protrusion is supported by protrusion support, the elastic force of the elastic member may be transmitted to the mirror housing through the detent member and the drive body and may act as a force that maintains the mirror housing proximate to the mirror base.

The detent groove and the detent protrusion may include a detent groove inclined surface and a detent protrusion inclined surface, respectively, which face each other in a rotation direction of the driving gear, and each of the detent groove inclined surface and the detent protrusion inclined surface may be inclined with respect to a longitudinal direction of the rotation axis of the mirror housing. More particularly, the detent groove inclined surface may include a first guide inclined surface formed on the bottom surface of the detent groove by a predetermined height, and a second guide inclined surface that extends from the first guide inclined surface to an upper surface of the detent member. An angle of the second guide inclined surface with respect to the bottom surface of the detent groove may be greater than an angle of the first guide inclined surface with respect to the bottom surface of the detent groove. Accordingly, when the driving motor generates the driving force while the detent groove inclined surface and the detent protrusion inclined surface abut each other, the drive body may rotate with respect to the driving gear.

The detent protrusion may be formed integrally with the driving gear and may include a plurality of detent protrusions, the plurality of detent protrusions may be disposed so that distances between adjacent detent protrusions are equal to one another along a circumferential direction of the driving gear. Similarly, the detent groove of the detent member may include a plurality of detent grooves, and the plurality of detent grooves may be disposed at positions corresponding to the plurality of detent protrusions.

The driving gear may be provided in the form of a worm gear, and the driving member may further include a transmission gear configured to transmit the driving force of the driving motor to the driving gear, and the transmission gear may include a first transmission gear provided in the form of a worm screw and gear-coupled to the driving gear.

The fixing member may include a ring-shaped seating surface to allow the drive body to be seated thereon, the seating surface may include at least one support protrusion that protrudes therefrom, and the drive body may include at least one support groove configured to be inserted into the support protrusion.

The support protrusion and the support groove may include a support protrusion inclined surface and a support groove inclined surface, respectively, which face each other in a rotation direction of the drive body, and each of the support protrusion inclined surface and the support groove inclined surface may be inclined with respect to the longitudinal direction of the rotation axis of the mirror housing. A protrusion support may be formed at a bottom corner of the detent groove and configured to support the detent protrusion in a state that the detent protrusion is separated from a bottom surface of the detent groove by a predetermined distance, and the height of the protrusion support from the bottom surface of the detent groove may be substantially equal to the height of the support protrusion from the seating surface.

The fixing member may include a rotation blocking member disposed on a rotation path of the detent protrusion and configured to obstruct the driving gear from rotating with respect to the fixing member in response to the rotation blocking member abutting the detent protrusion. Accordingly, in a state that the detent protrusion abuts the rotation blocking member and the driving gear is obstructed from rotating with respect to the fixing member, the driving force of the driving motor may act as a torque that rotates the drive body with respect to the driving gear. However, in response to an external torque being exerted to rotate the drive body with respect to the fixing member, the driving gear may be configured to rotate together with the drive body, and the detent protrusion may move to an upper surface of the detent member along inclined surfaces of the rotation blocking member and the detent groove.

The mirror housing may include at least one of a mirror configured to provide reflective images of the side and rear of the vehicle or an imaging device configured to generate photographed images of the side and rear of the vehicle.

As described herein, a driving apparatus for a vehicle according to embodiments of the present disclosure may prevent or reduce wind noise by maximally decreasing a gap between a mirror housing and a mirror base during driving. Further, abrasion between the mirror base and the mirror housing may be prevented or reduced by maintaining a particular gap between the mirror base and the mirror housing when the mirror housing rotates with respect to the mirror base.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
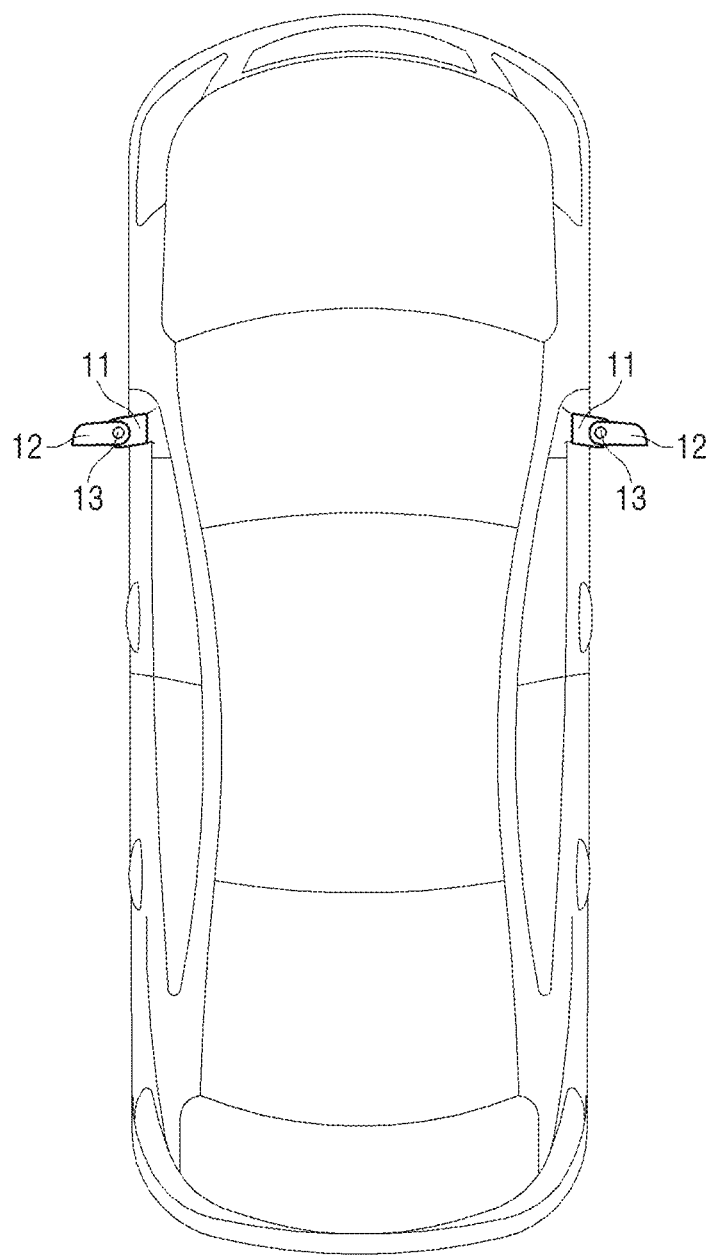
FIG. 1 illustrates a vehicle provided with an apparatus for operating a mirror housing of a vehicle according to an embodiment of the present disclosure.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure and to allow those skilled in the art to understand the scope of the present disclosure. The present disclosure is defined by the scope of the claims. Like reference numerals refer to like elements throughout the description of the figures.

Unless otherwise defined, all terms (including technical and scientific terms) used in the present specification may be used in a sense that can be commonly understood by those skilled in the art. In addition, the terms defined in the commonly used dictionaries are not to be too ideally or excessively interpreted unless they are specifically defined clearly.

Figure 2:
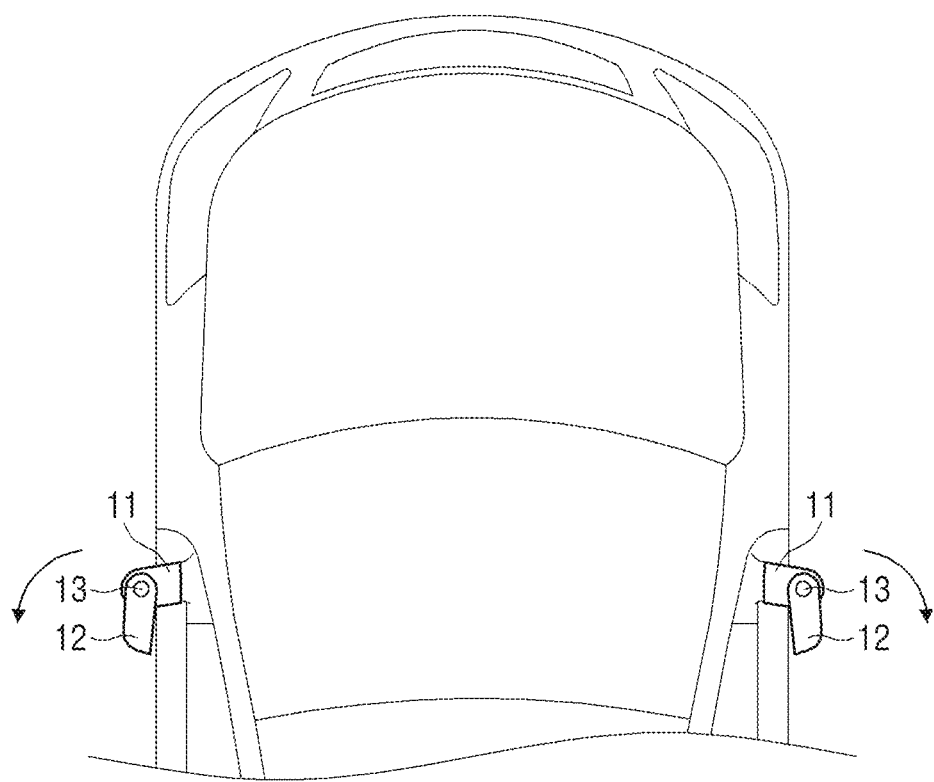
FIG. 2 depicts the mirror housing of the vehicle illustrated in FIG. 1 being folded.
Figure 3:
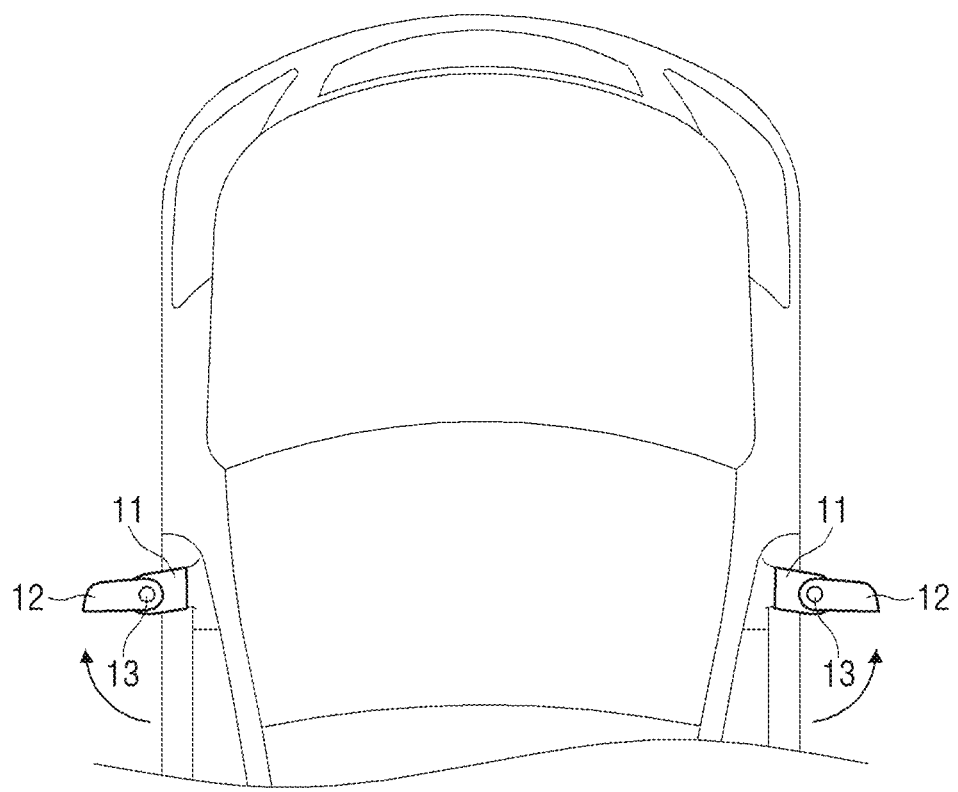
FIG. 3 depicts the mirror housing of the vehicle illustrated in FIG. 1 being unfolded.
Figure 4:
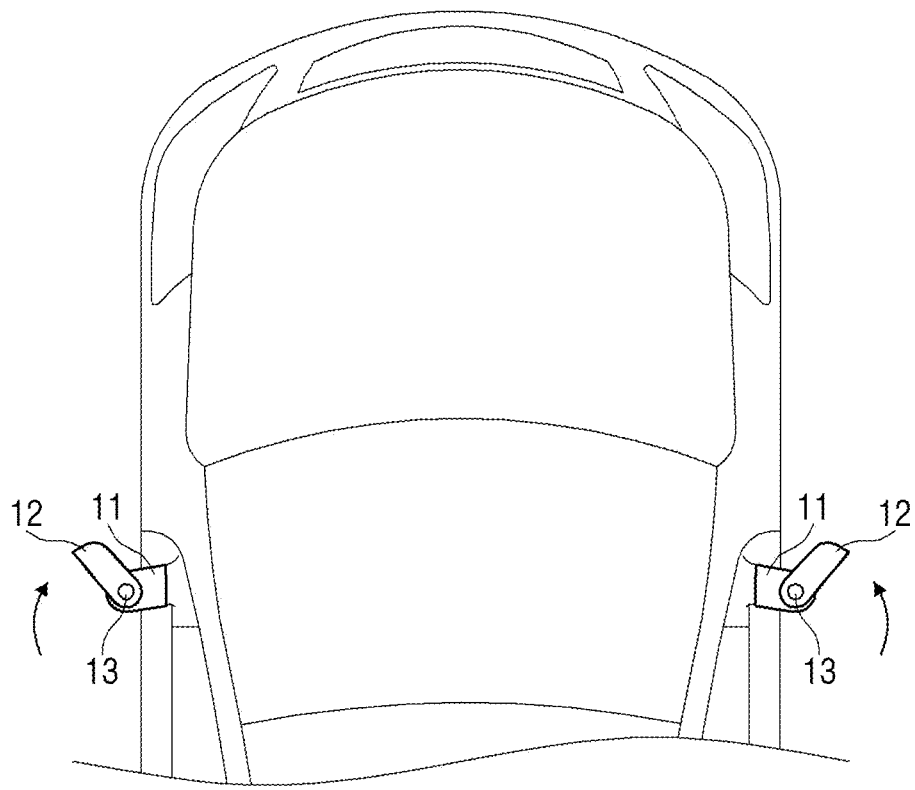
FIG. 4 depicts the mirror housing of the vehicle illustrated in FIG. 1 being folded in an opposite direction.

FIG. 1 illustrates a vehicle provided with an apparatus for operating a mirror assembly of a vehicle according to an embodiment of the present disclosure, FIG. 2 depicts a mirror housing of the vehicle illustrated in FIG. 1 being folded, FIG. 3 depicts the mirror housing of the vehicle illustrated in FIG. 1 being unfolded, and FIG. 4 depicts the mirror housing of the vehicle illustrated in FIG. 1 being folded in an opposite direction.

Referring to FIGS. 1 to 4, a vehicle 10 may include a mirror base 11, a mirror housing 12, and a driving apparatus 13. The mirror base 11 may be fixed to a vehicle body to support the mirror housing 12. The mirror housing 12 may provide a driver with the fields of view of the side and rear of the vehicle 10. For example, the mirror housing 12 may include at least one of mirror or an imaging device (e.g., camera). The mirror may provide reflective images of the side and rear of the vehicle 10, while the imaging device may generate photographed images of the side and rear of the vehicle 10. The photographed images generated by the imaging device may be still images or moving images.

The driver may check the fields of view of the side and rear of the vehicle 10 by referring to the reflective image provided via the mirror or the image generated by the imaging device. In order to output the image generated by the imaging device, a display means capable of outputting an image may be provided in an interior space the vehicle 10.

The driving apparatus 13 may generate a driving force and may rotate the mirror housing 12 with respect to the mirror base 11. The driving apparatus 13 may be provided in the mirror base 11 or the mirror housing 12. Hereinafter, the driving apparatus 13 provided in the mirror housing 12 will be mainly described as an example. However, the present disclosure is not limited thereto, and the driving apparatus 13 may be provided in the mirror base 11.

Referring to FIGS. 2 to 4, the mirror housing 12 may be folded or unfolded with respect to the mirror base 11. In the present disclosure, folding the mirror housing 12 means that the mirror housing 12 is retracted so that an outer end of the mirror housing 12 approaches the vehicle body, as illustrated in FIG. 2. When the vehicle 10 is parked or the vehicle 10 passes through a narrow space, the mirror housing 12 may be folded to secure a side space of the vehicle 10. In the present disclosure, unfolding the mirror housing 12 means that the mirror housing 12 is extended so that the outer end of the mirror housing 12 moves away from the vehicle body, as illustrated in FIG. 3. When driving the vehicle 10, the fields of view of the side and rear of the vehicle 10 may be provided to the driver by unfolding the mirror housing 12.

As illustrated in FIG. 4, the mirror housing 12 may be folded in a direction opposite to the folding direction illustrated in FIG. 2. When pedestrians, surrounding vehicles, or surrounding objects exert an external force on the mirror housing 12, the mirror housing 12 may be folded as illustrated in FIG. 4. This is to prevent pedestrians from being injured and/or to avoid inflicting damages to surrounding vehicles, surrounding objects, and/or to the mirror housing 12. Hereinafter, the folding direction illustrated in FIG. 4 is referred to as "reverse folding."

Hereinafter, as illustrated in FIG. 3, a position where the mirror housing 12 is unfolded with respect to the mirror base 11 to provide the driver with the fields of view of the side and rear of the vehicle 10 is referred to as a first position, and as illustrated in FIG. 2, a position where the mirror housing 12 is folded with respect to the mirror base 11 to secure a side space of the vehicle 10 is referred to as a second position. Furthermore, as illustrated in FIG. 4, a position where the mirror housing 12 is reverse-folded to prevent damages to the surrounding objects and to the mirror housing 12 is referred to as a third position. A position of the mirror housing 12 may be changed to the first position where the mirror housing 12 is unfolded with respect to the mirror base 11 or to the second position where the mirror housing 12 is folded with respect to the mirror base 11, and may be changed to the third position by an external force.

Figure 5:
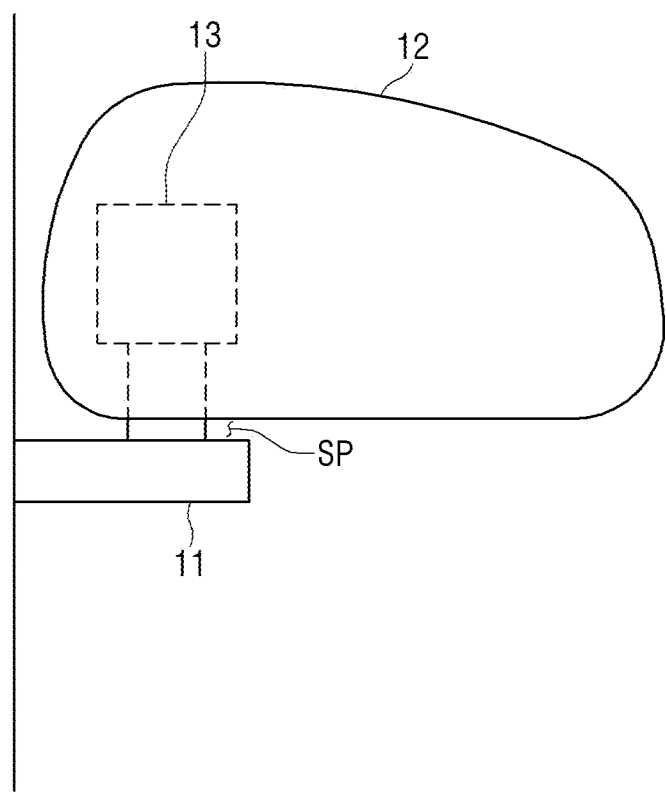
FIG. 5 illustrates a space formed between the mirror base and the mirror housing.
Figure 6:
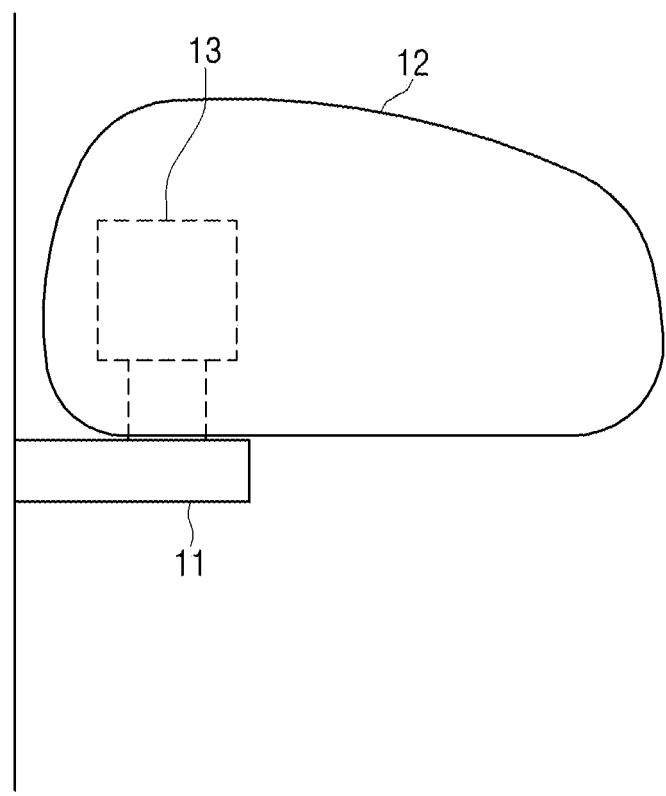
FIG. 6 illustrates the mirror housing disposed proximate to the mirror base.
Figure 7:
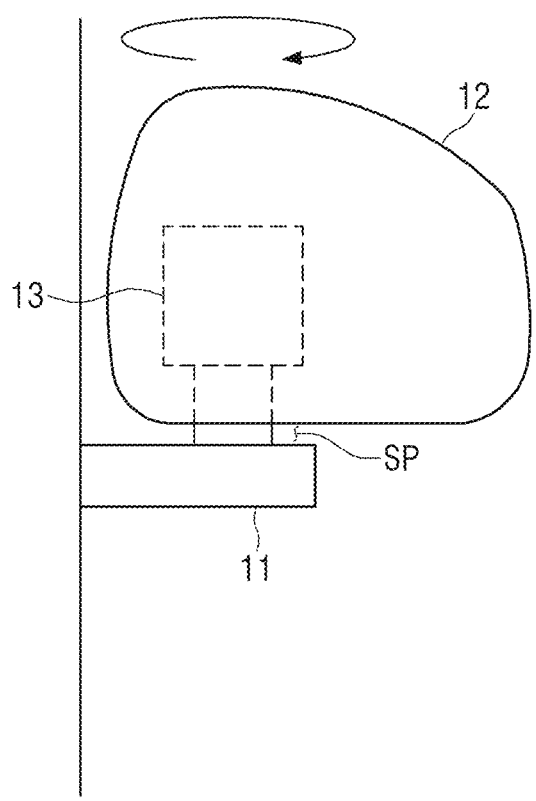
FIG. 7 depicts the mirror housing being folded.

FIG. 5 depicts a space (e.g., gap) formed between the mirror base and the mirror housing, FIG. 6 depicts the mirror housing disposed proximate to the mirror base, and FIG. 7 depicts the mirror housing being folded. Referring to FIGS. 5 to 7, the mirror housing 12 may be supported by the mirror base 11.

FIG. 5 illustrates that a space SP may be formed between the mirror housing 12 and the mirror base 11. Meanwhile, when the gap SP between the mirror housing 12 and the mirror base 11 is excessively large, air may flow into the corresponding space SP during driving of the vehicle 10, which may result in wind noise.

FIG. 6 illustrates that the mirror housing 12 may be disposed in close proximity with the mirror base 11. If the mirror housing 12 rotates with the mirror housing 12 contacting the mirror base 11, abrasion or scratch may occur due to the friction between the mirror housing 12 and the mirror base 11. Accordingly, excessively large or small gap between the mirror housing 12 and the mirror base 11 is problematic because the wind noise or the abrasion may occur.

The driving apparatus 13 according to an embodiment of the present disclosure may rotate the mirror housing 12 with respect to the mirror base 11 while preventing or reducing the wind noise or the abrasion. Specifically, when the mirror housing 12 is in the first position, the driving apparatus 13 may allow the mirror housing 12 to be in close contact with the mirror base 11. In addition, as illustrated in FIG. 7, when the position of the mirror housing 12 is changed from the first position to the second position, the driving apparatus 13 may allow the mirror housing 12 to be separated from the mirror base 11 by a certain distance. Since the mirror housing 12 rotates while being separated from the mirror base 11 by a certain distance, the occurrence of friction sound may be prevented. Furthermore, when the mirror housing 12 is disposed in the second position, since the vehicle is not driven, the space SP may be formed between the mirror housing 12 and the mirror base 11.

Hereinafter, the structure and function of the driving apparatus 13 according to an embodiment of the present disclosure will be described in detail with reference to FIGS. 8 to 37.

Figure 8:
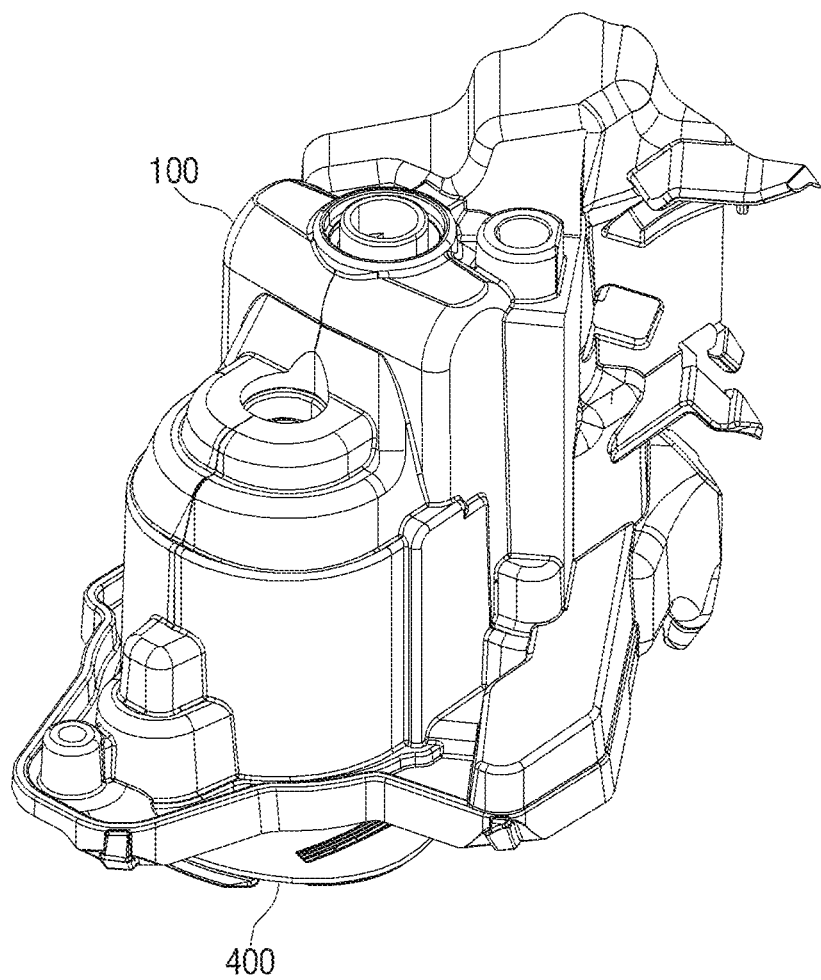
FIG. 8 is a perspective view of a driving apparatus for a vehicle according to an embodiment of the present disclosure.
Figure 9:
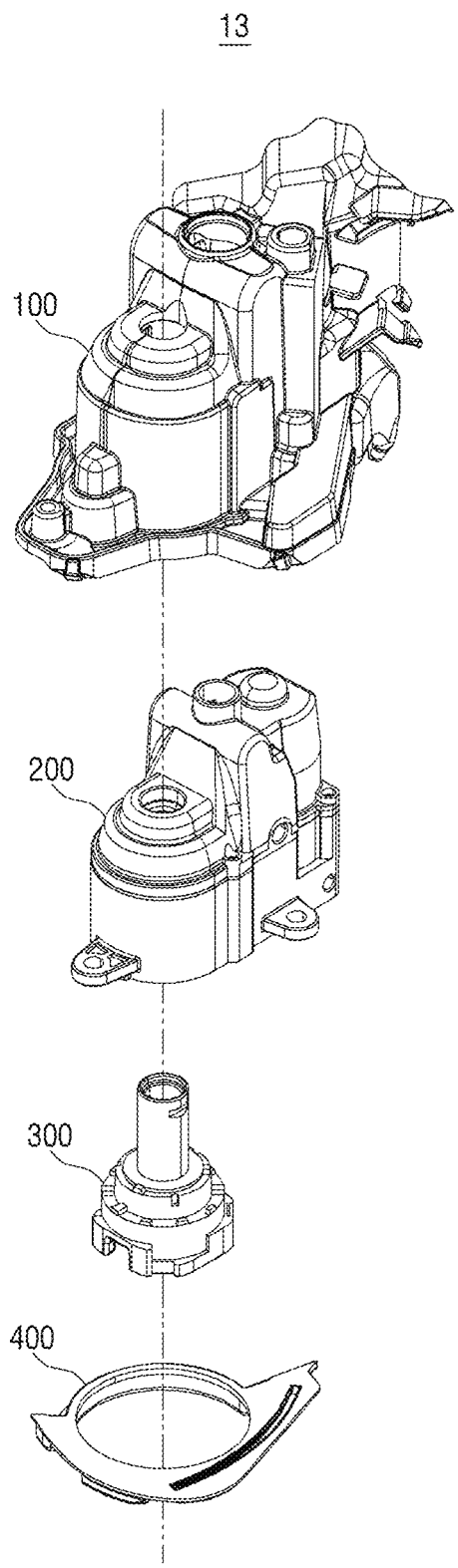
FIG. 9 is an exploded perspective view of the driving apparatus according to an embodiment of the present disclosure.

FIG. 8 is a perspective view of the driving apparatus for a vehicle according to an embodiment of the present disclosure, and FIG. 9 is an exploded perspective view of the driving apparatus according to an embodiment of the present disclosure. Referring to FIGS. 8 and 9, the driving apparatus 13 according to an embodiment of the present disclosure may include a main cover 100, a driving member 200, a fixing member 300, and a base cover 400.

The main cover 100 may accommodate the driving member 200 and the fixing member 300 and may be fixed to the mirror housing 12. Herein, the driving member 200 may be fixed to the main cover 100. Accordingly, the mirror housing 12, the main cover 100, and the driving member 200 may be integrally operated. For instance, the mirror housing 12, the main cover 100, and the driving member 200 may rotate simultaneously with respect to the fixed member 300 by a driving force generated from the driving member 200.

The driving member 200 may be fixed to the mirror housing 12 of the vehicle 10 and may rotate the mirror housing 12 with respect to the fixing member 300 by generating the driving force. More specifically, the driving member 200 may be fixed to the mirror housing 12 through the main cover 100, and the driving force of the driving member 200 may be transmitted to the mirror housing 12 through the main cover 100.

The driving member 200 may move the mirror housing 12 proximate to the mirror base 11 at a preset reference interval when the position of the mirror housing 12 is changed from the second position to the first position. Herein, the reference interval may include no (zero) interval. For example, the driving member 200 may bring the mirror housing 12 into close contact with the mirror base 11 in the first position of the mirror housing 12. As the mirror housing 12 is disposed proximate to the mirror base 11, the occurrence of the wind noise may be prevented or reduced.

In addition, when the position of the mirror housing 12 is changed from the first position to the second position, the driving member 200 may separate the mirror housing 12 from the mirror base 11 to an interval exceeding the reference interval. As the mirror housing 12 is separated apart from the mirror base 11, the friction or abrasion between the mirror housing 12 and the mirror base 11 may be prevented or reduced.

The fixing member 300 may be fixed to the mirror base 11 of the vehicle 10. In addition, the fixing member 300 may provide a reference of rotation for the driving member 200. In other words, the driving member 200 may be rotatably coupled to the fixing member 300 and may rotate with respect to a rotation axis of the fixing member 300.

The base cover 400 may be fixed to the mirror base 11 while sealing an opening of the mirror base 11. In addition, as described below, the base cover 400 may determine a range of rotation for the main cover 100.

Figure 10:
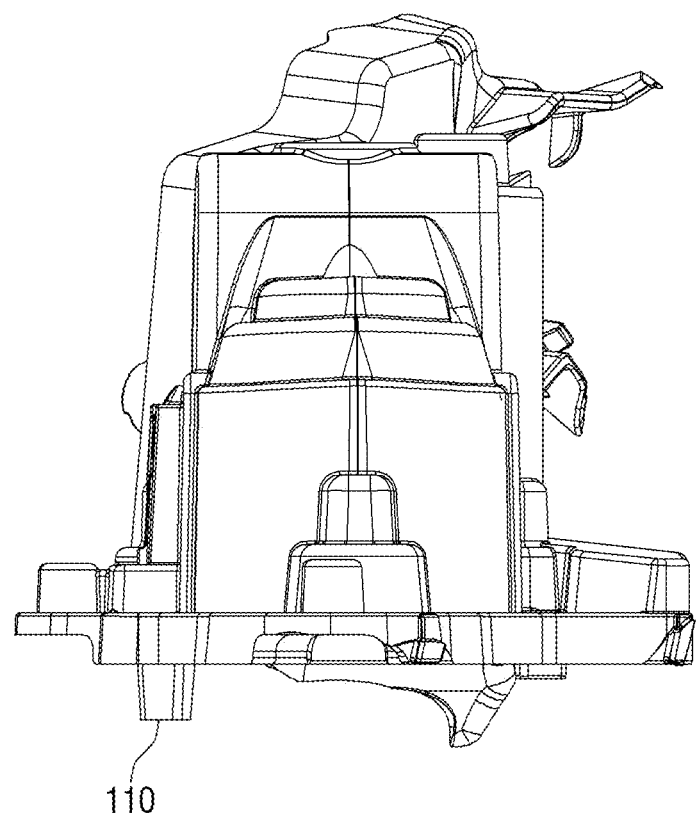
FIG. 10 is a front view of a main cover of the driving apparatus according to an embodiment of the present disclosure.
Figure 11:
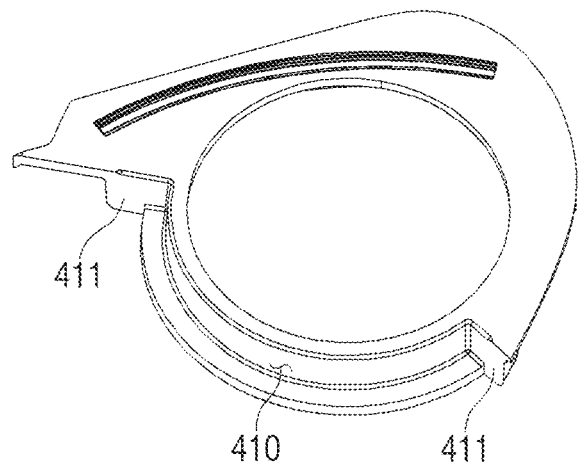
FIG. 11 is a perspective view of a base cover of the driving apparatus according to an embodiment of the present disclosure.
Figure 12:
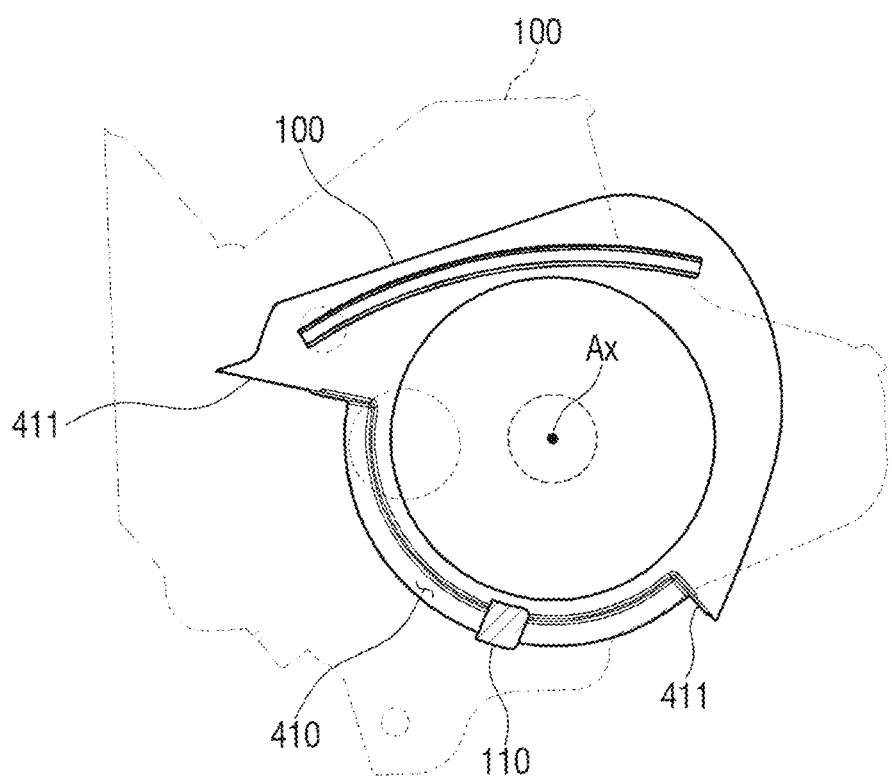
FIG. 12 depicts an operation of the main cover with respect to the base cover of the driving apparatus according to an embodiment of the present disclosure.

FIG. 10 is a front view of the main cover 100, FIG. 11 is a perspective view of the base cover 400, and FIG. 12 is a view explaining an operation of the main cover 100 with respect to the base cover 400. Referring to FIGS. 10 to 12, the main cover 100 may include a cover protrusion 110 that protrudes towards the base cover 400, and the base cover 400 may include a cover groove 410 having a predetermined length in a circumferential direction. The cover protrusion 110 may be inserted into the cover groove 410. When the main cover 100 rotates with respect to the base cover 400, the cover protrusion 110 may move along the cover groove 410. Rotation blocking surfaces 411 may be provided in both ends of the cover groove 410. When the cover protrusion 110 abuts the rotation blocking surfaces 411, the rotation of the main cover 100 may be blocked. Accordingly, the rotational range of the main cover 100 with respect to the base cover 400 may be limited to the length of the cover groove 410.

Figure 13:
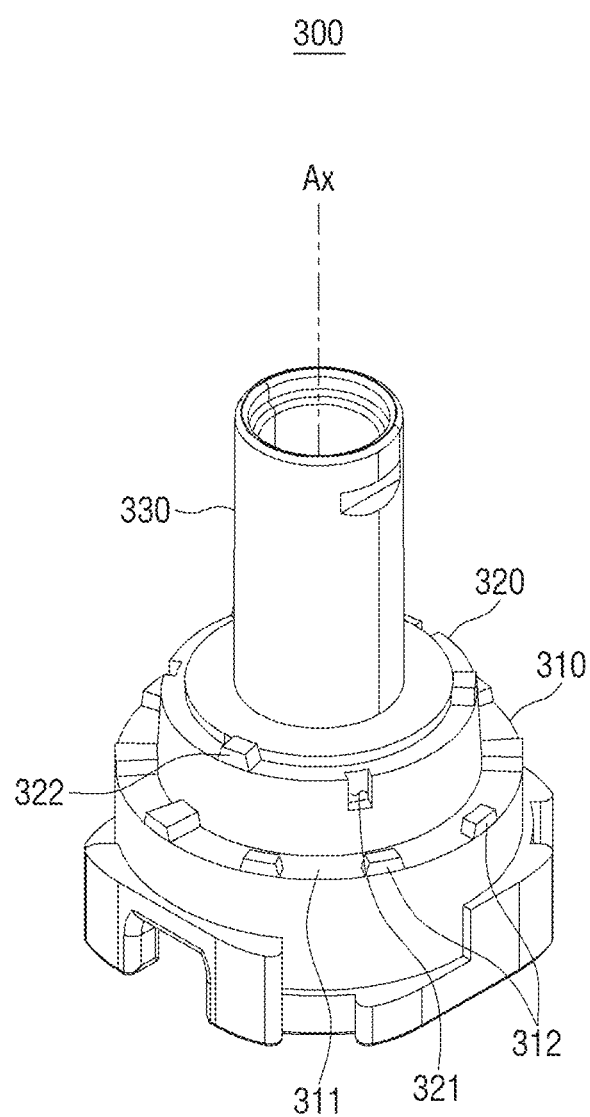
FIG. 13 is a perspective view of a fixing member of the driving apparatus according to an embodiment of the present disclosure.

FIG. 13 is a perspective view of the fixing member 300. Referring to FIG. 13, the fixing member 300 may be formed by stacking a plurality of cylinders 310, 320, and 330 having different diameters.

The plurality of cylinders 310, 320, and 330 may include a first cylinder 310, a second cylinder 320, and a third cylinder 330. All central axes of the first cylinder 310, the second cylinder 320, and the third cylinder 330 may correspond to one another. Herein, a central axis Ax of the first cylinder 310, the second cylinder 320, and the third cylinder 330 may be the rotation axis of the mirror housing 12 with respect to the mirror base 11 or the rotation axis of the driving member 200 with respect to the fixing member 300. Hereinafter, the central axis is referred to as the rotation axis.

The first cylinder 310 may be coupled to a drive body 210 (see FIG. 14) of the driving member 200 and may provide the rotational reference of the drive body 210. The drive body 210 may abut an outer circumferential face of the first cylinder 310 and may rotate with respect to a rotation axis Ax.

The second cylinder 320 may be coupled to the detent member 220 (see FIG. 14) of the driving member 200 and may guide the detent member 220. The detent member 220 may abut an outer circumferential face of the second cylinder 320 and may move along the vertical (e.g., axial) direction of the second cylinder 320 parallel to the rotation axis Ax.

In order to provide the movement path of the detent member 220, a movement path groove 321 may be formed in the second cylinder 320. The movement path groove 321 may be formed by recessing an outer surface of the second cylinder 320 along the direction parallel to the rotation axis Ax. As described below, a movement path protrusion 221 (see FIG. 20) configured to be inserted into the movement path groove 321 may be formed in the detent member 220. The movement path protrusion 221 may be inserted into the movement path groove 321 and may be guided along the direction parallel to the rotation axis Ax. Accordingly, the detent member 220 may be allowed to move with respect to the second cylinder 320 along the axial direction and prevented from rotating with respect to the second cylinder 320.

The third cylinder 330 may be coupled to an elastic member 250 (see FIG. 14) of the driving member 200 and may fix the position of the elastic member 250. The elastic member 250 may expand or contract in the vertical direction of the third cylinder 330. In addition, the third cylinder 330 may be coupled to a driving gear 230 (see FIG. 14) of the driving member 200 and may provide a rotation reference and a movement reference of the driving gear 230. The driving gear 230 may abut an outer circumferential face of the third cylinder 330 to rotate with respect to the rotation axis Ax or move in the vertical direction of the third cylinder 330.

The fixing member 300 may include a ring-shaped seating surface 311 to allow the drive body 210 to be seated thereon, and the seating surface 311 may include at least one support protrusion 312 that protrudes from a surface thereof. The seating surface 311 may be formed in the first cylinder 310. For example, the seating surface 311 may be formed parallel to an imaginary surface perpendicular to the rotation axis Ax. Furthermore, the support protrusion 312 may protrude in the direction parallel to the rotation axis Ax. The support protrusion 312 may be inserted into at least one support groove 213 (see FIG. 16) of the drive body 210 described below.

The fixing member 300 may include a rotation blocking member 322. The rotation blocking member 322 may be disposed on a rotation path of the driving gear 230 for the fixing member 300 and be in contact with a detent protrusion 231 (see FIG. 18) of the driving gear 230, thereby obstructing the rotation of the driving gear 230 with respect to the fixing member 300. Although FIG. 13 illustrates that the second cylinder 320 includes the rotation blocking member 322, in some embodiments of the present disclosure, the first cylinder 310 may include the rotation blocking member 322.

Figure 14:
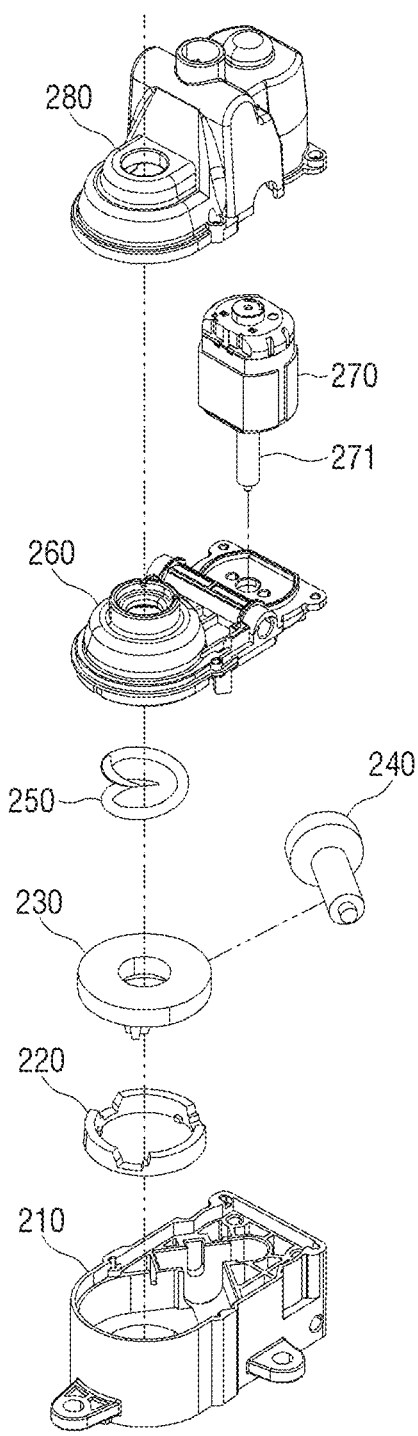
FIG. 14 is an exploded perspective view of a driving member of the driving apparatus according to an embodiment of the present disclosure.
Figure 15:
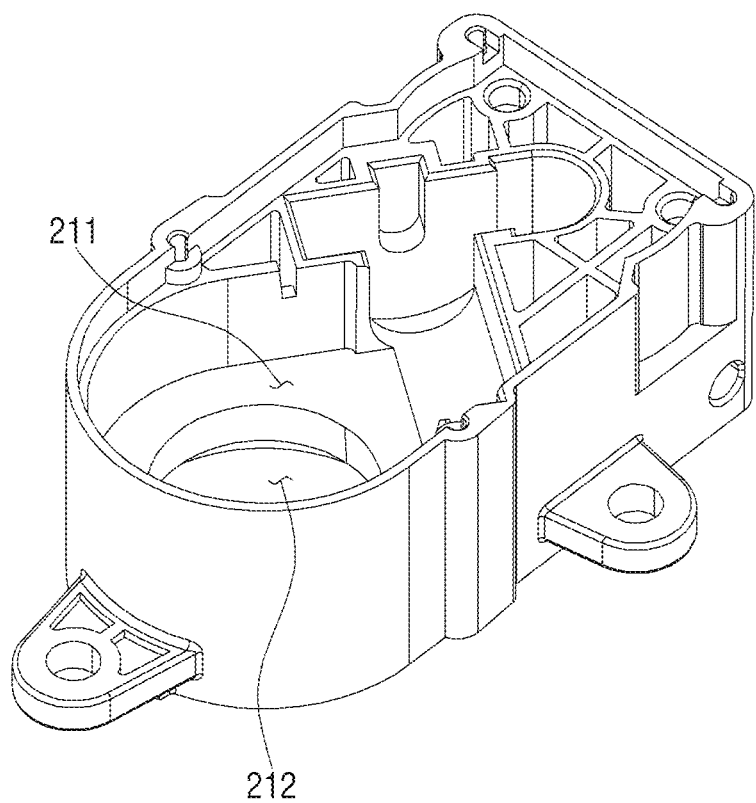
FIG. 15 is a perspective view of a drive body of the driving apparatus according to an embodiment of the present disclosure.
Figure 16:
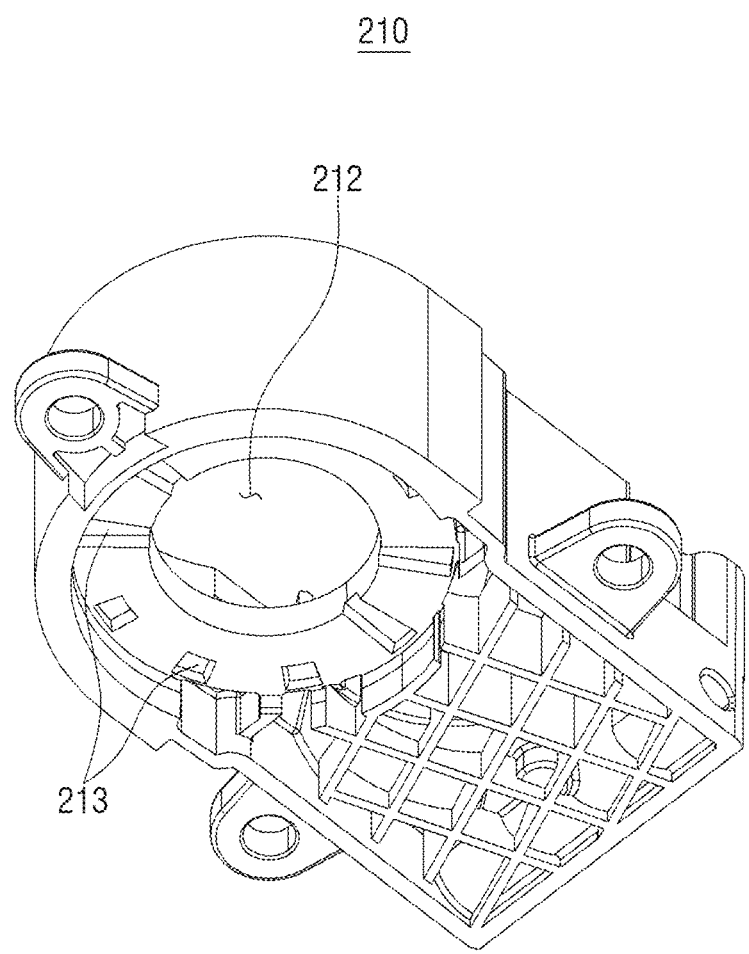
FIG. 16 is a bottom perspective view of the drive body of the driving apparatus according to an embodiment of the present disclosure.
Figure 17:
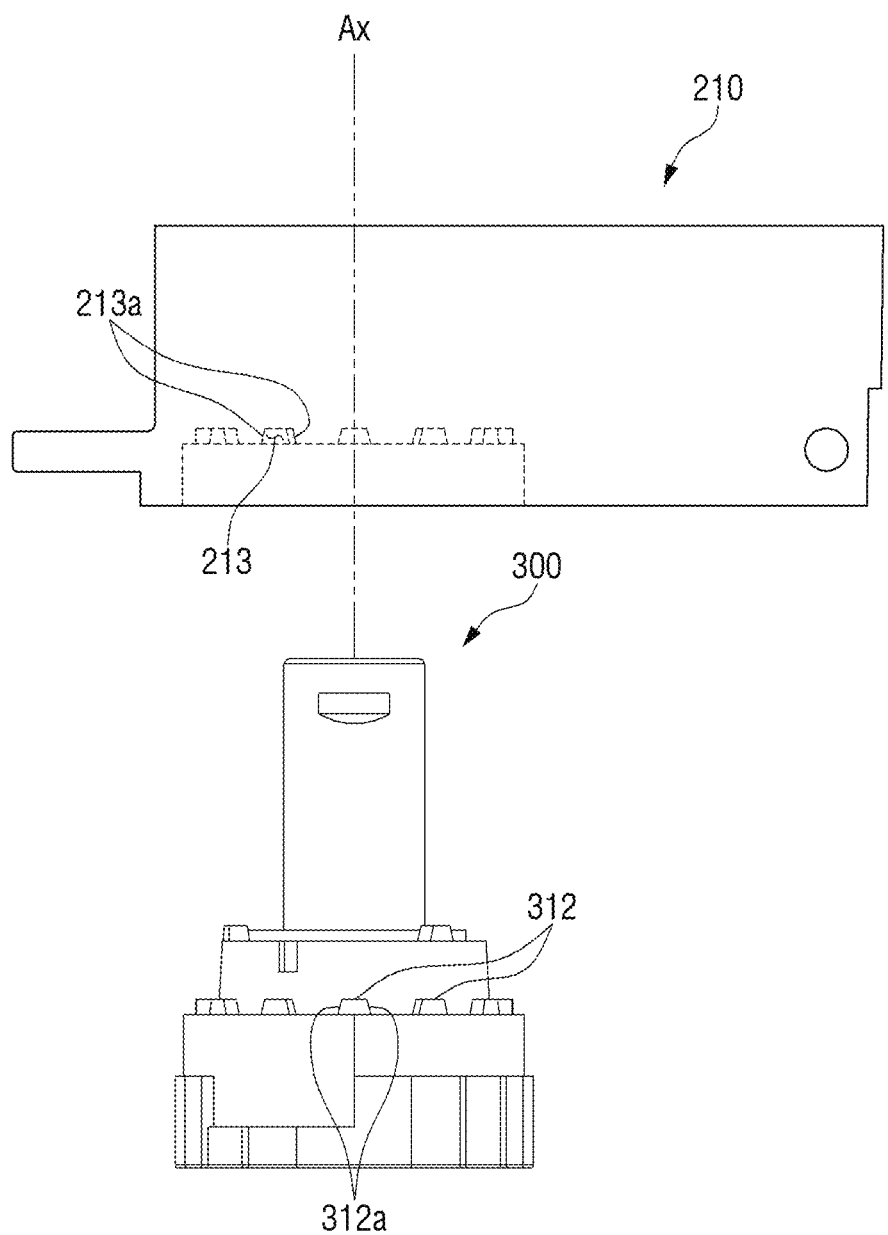
FIG. 17 depicts a coupling relationship between the drive body and the fixing member of the driving apparatus according to an embodiment of the present disclosure.
Figure 18:
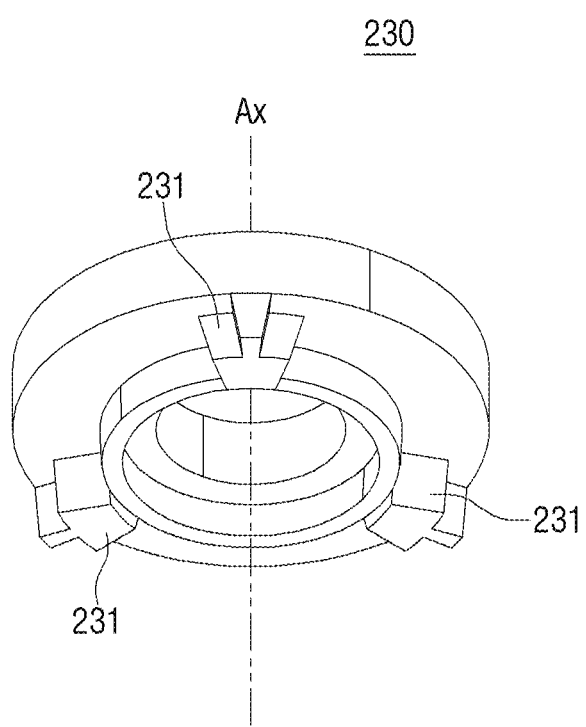
FIG. 18 is a bottom perspective view of a driving gear of the driving apparatus according to an embodiment of the present disclosure.
Figure 19:
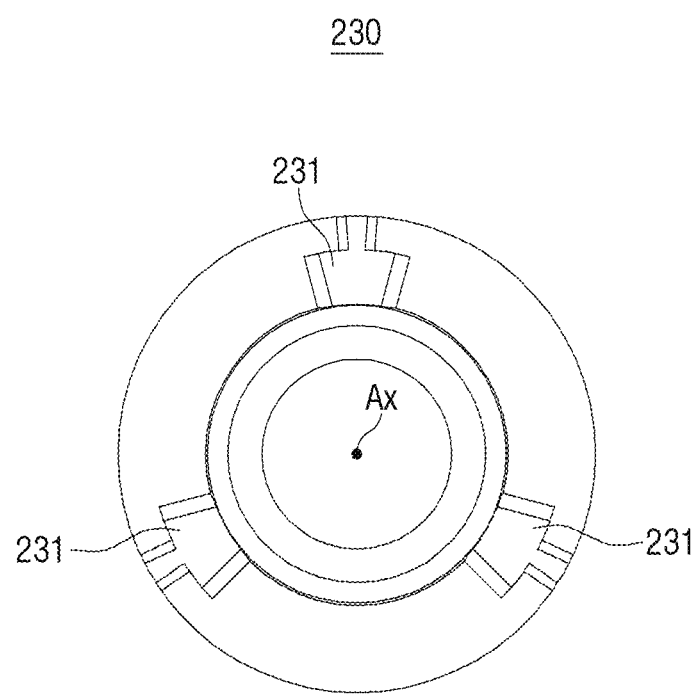
FIG. 19 is a bottom view of the driving gear of the driving apparatus according to an embodiment of the present disclosure.
Figure 20:
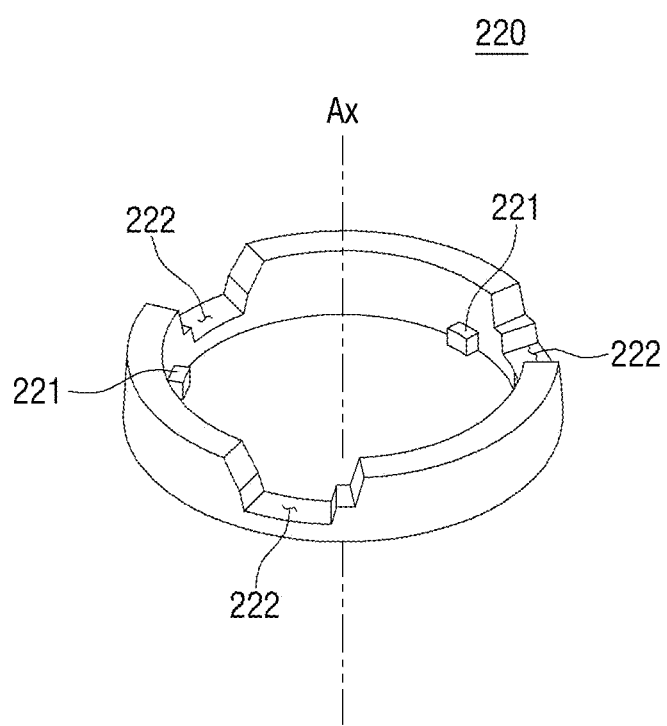
FIG. 20 is a perspective view of a detent member of the driving apparatus according to an embodiment of the present disclosure.
Figure 21:
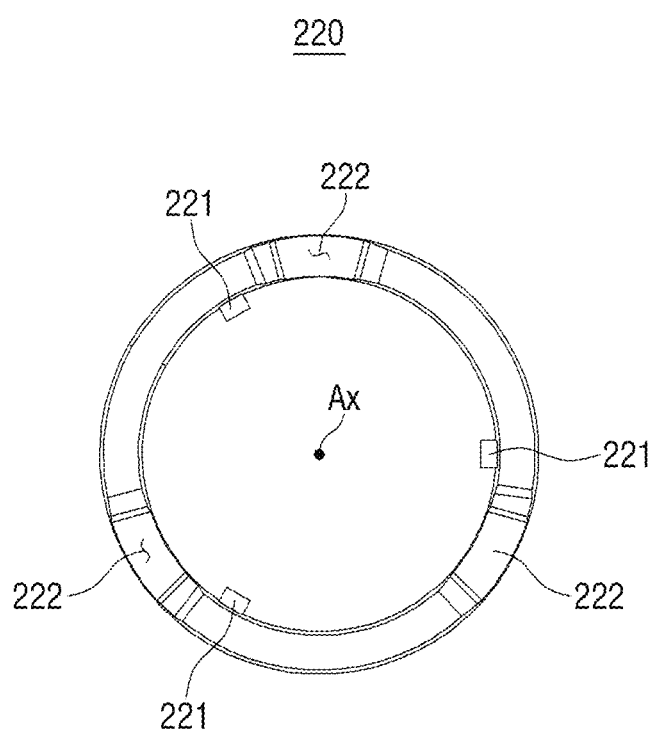
FIG. 21 is a top plan view of the detent member of the driving apparatus according to an embodiment of the present disclosure.
Figure 22:
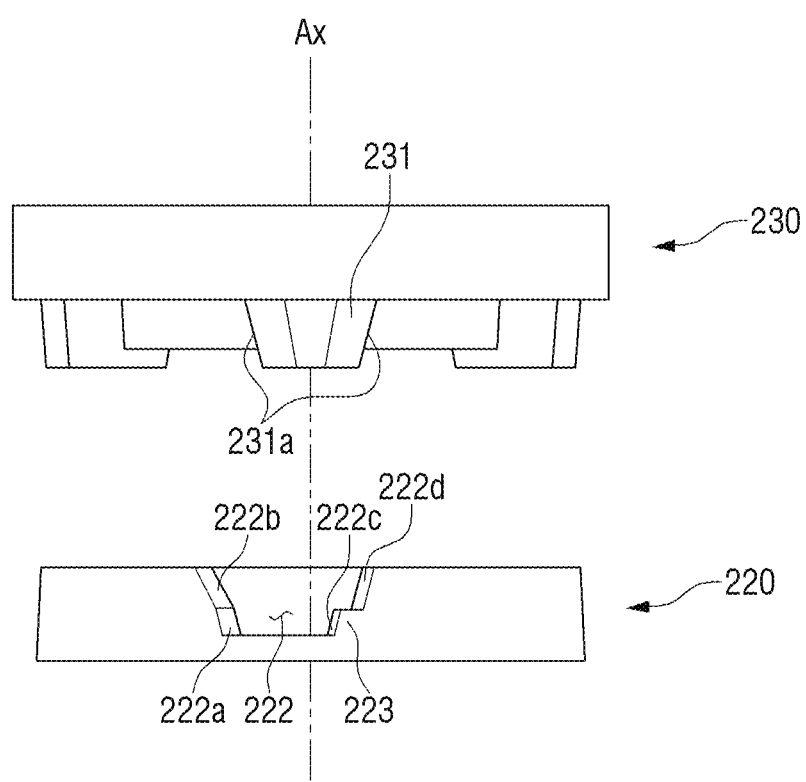
FIG. 22 depicts a coupling relationship between the driving gear and the detent member of the driving apparatus according to an embodiment of the present disclosure.
Figure 23:
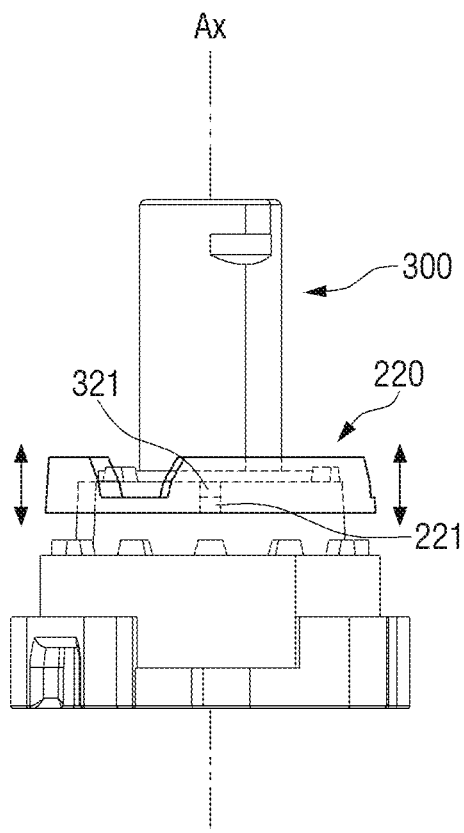
FIG. 23 depicts a coupling relationship between the fixing member and the detent member of the driving apparatus according to an embodiment of the present disclosure.

FIG. 14 is an exploded perspective view of the driving member 200, FIG. 15 is a perspective view of the drive body 210, FIG. 16 is a bottom perspective view of the drive body 210, FIG. 17 illustrates a coupling relationship between the drive body 210 and the fixing member 300, FIG. 18 is a bottom perspective view of the driving gear 230, FIG. 19 is a bottom view of the driving gear 230, FIG. 20 is a perspective view of the detent member 220, FIG. 21 is a top plan view of the detent member 220, FIG. 22 illustrates a coupling relationship between the driving gear 230 and the detent member 220, and FIG. 23 illustrates a coupling relationship between the fixing member 300 and the detent member 220.

Referring to FIG. 14, the driving member 200 may include the drive body 210, the detent member 220, the driving gear 230, a transmission gear 240, the elastic member 250, a motor support 260, a driving motor 270, and a drive cover 280.

The drive body 210 may be rotatably coupled to the fixing member 300. Accordingly, the drive body 210 may rotate with respect to the fixing member 300. The drive body 210 may be fixedly coupled to the mirror housing 12. More specifically, the drive body 210 may be fixed to the mirror housing 12 via the main cover 100.

The drive body 210 may be coupled to the drive cover 280 to provide an accommodation space for accommodating the detent member 220, the driving gear 230, the transmission gear 240, the elastic member 250, the motor support 260, and the driving motor 270. The drive body 210, the detent member 220, the driving gear 230, the transmission gear 240, the elastic member 250, the motor support 260, the driving motor 270, and the drive cover 280 may be operated as a unit.

Referring to FIGS. 15 and 16, the drive body 210 may include an accommodation space 211, a through hole 212, and a support groove 213. The detent member 220, the driving gear 230, the transmission gear 240, the elastic member 250, and the motor support 260 may be accommodated in the accommodation space 211. The third cylinder 330 of the fixing member 300 may penetrate through the through hole 212. The support protrusion 312 of the fixing member 300 may be inserted into the support groove 213. As the support protrusion 312 is inserted into the support groove 213, the positions of the drive body 210 for the fixing member 300 may be fixed.

Referring to FIG. 17, the drive body 210 may be rotatably coupled to the fixing member 300. The drive body 210 and the fixing member 300 may be coupled by stacking the drive body 210 on the fixing member 300 in the direction parallel to the rotation axis Ax.

The support groove 213 may be formed in the drive body 210, and the support protrusion 312 may be formed in the fixing member 300. The support protrusion 312 and the support groove 213 may include a support protrusion inclined surface 312a and a support groove inclined surface 213a, respectively, which face each other in the rotation direction of the drive body 210 with respect to the fixing member 300 and are inclined with respect to the longitudinal direction of the rotation axis Ax of the mirror housing 12.

When a relatively small torque is exerted on the drive body 210 with respect to the rotation axis Ax in a state where the support protrusion 312 is inserted into the support groove 213, the support protrusion 312 may remain inserted into the support groove 213, and the position of the drive body 210 with respect to the fixing member 300 may remain fixed. On the other hand, when a relatively large torque is exerted on the drive body 210 with respect to the rotation axis Ax in the state where the support protrusion 312 is inserted into the support groove 213, as the support protrusion inclined surface 312a and the support groove inclined surface 213a may be dislodged from each other, the drive body 210 may ascend along the support protrusion 310. For example, when the drive body 210 is rotated by the force of the driving motor 270, the support protrusion 312 may be dislodged from the support groove 213, and the drive body 210 may ascend along the support protrusion 312. In such case, the drive body 210 may move in the direction parallel to the rotation axis Ax by the height of the support protrusion 312 from the seating surface 311.

As described above, the fixing member 300 may be fixed to the mirror base 11, and the drive body 210 may be fixed to the mirror housing 12. When the drive body 210 moves with respect to the fixing member 300 in the direction of dislodging the support protrusion 312 from the support groove 213, a gap between the mirror base 11 and the mirror housing 12 may increase. When the position of the mirror housing 12 is changed from the first position to the second position, the gap between the mirror base 11 and the mirror housing 12 may increase as the support protrusion 312 is dislodged from the support groove 213, thus preventing the friction between the mirror base 11 and the mirror housing 12.

Herein, although the description has been given for an example where the support protrusion 312 is included in the fixing member 300 and the support groove 213 is included in the drive body 210, the present disclosure is not limited thereto. In some embodiments, the support protrusion 312 may be included in the drive body 210, and the support groove 213 may be included in the fixing member 300.

Referring to FIGS. 18 and 19, the driving gear 230 may be formed in the shape of a disk (e.g., annulus) with an aperture at the center thereof. The aperture may be penetrated by the third cylinder 330 of the fixing member 300. An inner surface of the aperture may abut the outer circumferential surface of the third cylinder 330. The driving gear 230 may rotate or move vertically while abutting the third cylinder 330.

Gear teeth may be formed on an outer circumferential surface of the driving gear 230. The driving gear 230 may be gear-coupled to the transmission gear 240 by using the gear teeth. The transmission gear 240 may transmit the driving force generated by the driving motor 270, and accordingly, the driving gear 230 may be rotated by the driving force of the driving motor 270.

The driving gear 230 may include at least one detent protrusion 231. The detent protrusion 231 may protrude from a surface of the driving gear 230. By way of example, the detent protrusion 231 may protrude downward from a bottom surface thereof, the bottom surface being perpendicular to the rotation axis Ax. The driving gear 230 may be stacked on the detent member 220 in the direction parallel to the rotation axis Ax of the mirror housing 12. When the driving gear 230 is stacked on the detent member 220, the detent protrusion 231 may be inserted into a detent groove 222 (see FIG. 22). The position of the driving gear 230 relative to the detent member 220 may be fixed by the detent protrusion 231 inserted into the detent groove 222.

The driving gear 230 may include a plurality of detent protrusions 231, all of which may be disposed so that distances between adjacent protrusions along the circumferential direction of the driving gear 230 are equal. By way of example, referring to FIG. 19, the distance between a top detent protrusion 231 and a left detent protrusion 231, the distance between the top detent protrusion 231 and a right detent protrusion 231, and the distance between the left detent protrusion 231 and the right detent protrusion 231 may be substantially equal. Here, the top, left, and right detent protrusions are designated in terms of the orientation as shown in FIG. 19 for the purpose of description, regardless of their actual positions when assembled in the driving apparatus according to an embodiment of the present disclosure.

Referring to FIGS. 20 and 21, the detent member 220 may be provided in the shape of a ring. The detent member 220 may include the movement path protrusion 221 and the detent groove 222. The movement path protrusion 221 may be inserted into the movement path groove 321 of the second cylinder 320. The movement path protrusion 221 may protrude inward from the inner circumferential side of the detent member 220.

The detent protrusion 231 of the driving gear 230 may be inserted into the detent groove 222 of the detent member 220. Accordingly, the position of the driving gear 230 relative to the detent member 220 may be fixed by the detent protrusion 231 inserted into the detent groove 222.

The detent member 220 may include a protrusion support 223 formed at a bottom corner of the detent groove 222. The protrusion support 223 may protrude inward from the detent groove 222 and may support the detent protrusion 231 in a state where the detent protrusion 231 is separated from a bottom surface of the detent groove 222 by a predetermined distance. The detent protrusion 231 may be supported by the protrusion support 223 when the driving gear 230 is rotated counterclockwise with respect to the detent member 220. Alternatively, the detent protrusion 231 may fall from the protrusion support 223 so that the detent protrusion 231 may rest on the bottom surface of the detent groove 222.

The detent member 220 may include a plurality of detent grooves 222, all of which may be disposed at positions corresponding to the plurality of detent protrusions 231. More specifically, the plurality of detent grooves 222 may be disposed so that distances between adjacent grooves are identical to one another along the circumferential direction of the detent member 220. By way of example, referring to FIG. 21, the distance between a top detent groove 222 and a left detent groove 222, the distance between the top detent groove 222 and a right detent groove 222, and the distance between the left detent groove 222 and the right detent groove 222 may be substantially equal. Here, the top, left, and right detent grooves are designated in terms of the orientation as shown in FIG. 21 for the purpose of description, regardless of their actual positions when assembled in the driving apparatus according to an embodiment of the present disclosure.

Referring to FIG. 22, the driving gear 230 and the detent member 220 may be coupled to each other by stacking the driving gear 230 on the detent member 220. When the driving gear 230 is coupled to the detent member 220, the detent protrusion 231 of the driving gear 230 may be inserted into the detent groove 222 of the detent member 220.

The detent groove 222 and the detent protrusion 231 may include detent groove inclined surfaces 222a, 222b, 222c, and 222d, and detent protrusion inclined surfaces 231a, respectively, which face each other in the rotation direction of the driving gear 230 with respect to the detent member 220 and are inclined with respect to the longitudinal direction of the rotation axis Ax of the mirror housing 12. When the driving gear 230 rotates with respect to the detent member 220, the detent protrusion inclined surfaces 231a may abut the detent groove inclined surfaces 222a, 222b, 222c, and 222d.

When the driving motor 270 generates the driving force in a state where the detent groove inclined surfaces 222a, 222b, 222c, and 222d abut the detent protrusion inclined surfaces 231a, the drive body 210 may rotate with respect to the driving gear 230. In other words, since the rotation of the driving gear 230 with respect to the fixing member 300 may be obstructed by the detent member 220, the drive body 210 may rotate with respect to the driving gear 230 instead. In this way, the position of the mirror housing 12 may be changed from the first position to the second position or may be changed from the second position to the first position.

The detent groove 222 may include the guide inclined surfaces 222a and 222b. The guide inclined surfaces 222a and 222b may include a first guide inclined surface 222a and a second guide inclined surface 222b. The first guide inclined surface 222a may be formed by a particular height from the bottom surface of the detent groove 222, and the second guide inclined surface 222b may extend from the end of the first guide inclined surface 222a to an upper surface of the detent member 220.

The rotation of the driving gear 230 with respect to the detent member 220 may be limited in a state where the detent protrusion inclined surface 231a abuts the guide inclined surfaces 222a and 222b. When the detent protrusion inclined surface 231a abuts the guide inclined surfaces 222a and 222b, the driving gear 230 may not rotate with respect to the detent member 220 even if an external torque equal to or less than a threshold value is exerted on the driving gear 230. Meanwhile, when an external torque greater than the threshold value is transmitted to the driving gear 230, the driving gear 230 may be rotated with respect to the detent member 220. In such case, as the detent protrusion inclined surface 231a are displaced from the guide inclined surfaces 222a and 222b, the detent protrusion 231 may ascend along the guide inclined surfaces 222a and 222b. When the detent protrusion 231 ascends along the guide inclined surfaces 222a and 222b, the driving gear 230 may move axially along the direction parallel to the rotation axis Ax.

In the present disclosure, an angle of the second guide inclined surface 222b with respect to the bottom surface of the detent groove 222 may exceed an angle of the first guide inclined surface 222a with respect to the bottom surface of the detent groove 222. Accordingly, a relatively greater torque is required for the detent protrusion 231 to begin ascending along the first guide inclined surface 222a. However, a relatively smaller torque may be required once the detent protrusion 231 deviates from the first guide inclined surface 222a and ascends along the second guide inclined surface 222b.

Support inclined surfaces may be provided on the opposite side of the guide inclined surfaces 222a and 222b. The support inclined surfaces may include a first support inclined surface 222c and a second support inclined surface 222d. The first support inclined surface 222c may be formed on a side surface of the protrusion support 223, and the second support inclined surface 222d may be formed to connect the upper surface of the detent member 220 to an upper surface of the protrusion support 223.

When the detent protrusion inclined surface 231a abuts the support inclined surfaces, the rotation of the driving gear 230 with respect to the detent member 220 may be limited. When the detent protrusion inclined surface 231a abuts the support inclined surface, the driving gear 230 may not rotate with respect to the detent member 220 even if an external torque equal to or less that a threshold value is exerted on the driving gear 230. Meanwhile, when the external torque, e.g., the driving force of the driving motor 270, exceeding the threshold value is transmitted to the driving gear 230, the driving gear 230 may rotate with respect to the detent member 220. In such case, the detent protrusion 231 may ascend along the support inclined surfaces while the detent protrusion inclined surface 231a is displaced from the support inclined surfaces. When the detent protrusion 231 ascends along the first support inclined surface 222c, the detent protrusion 231 may be supported by the protrusion support 223.

When the external torque continues to be exerted on the driving gear 230 while the detent protrusion 231 is supported by the protrusion support 223, the detent protrusion 231 may ascend along the second support inclined surface 222d.

Referring to FIG. 23, the detent member 220 may be coupled to the fixing member 300. The detent member 220 may be blocked from rotating in the rotation direction of the mirror housing 12 with respect to the fixing member 300, and may be coupled to the fixing member 300 so that it may move axially in the direction parallel to the rotation axis Ax of the mirror housing 12.

As described above, the movement path groove 321 may be formed in the fixing member 300, and the movement path protrusion 221 may be formed in the detent member 220. The movement path protrusion 221 may be inserted into the movement path groove 321 while the detent member 220 is stacked on the fixing member 300. The detent member 220 may be blocked from rotating with respect to the fixing member 300 in a state where the movement path protrusion 221 is inserted into the movement path groove 321.

Meanwhile, the movement path groove 321 may be elongated in the direction parallel to the rotation axis Ax. Accordingly, the movement path protrusion 221 may move in the longitudinal (e.g., axial) direction of the movement path groove 321. Within the movement range of the movement path protrusion 221 for the movement path groove 321, the detent member 220 may move in the direction parallel to the rotation axis Ax.

Referring back to FIG. 14, the transmission gear 240 may transmit the driving force of the driving motor 270 to the driving gear 230. The transmission gear 240 may be gear-coupled to a pinion gear 271 of the driving motor 270 to receive the driving force of the driving motor 270. The transmission gear 240 may be gear-coupled to the driving gear 230 and may transmit the driving force transmitted from the driving motor 270 to the driving gear 230.

The elastic member 250 may generate an elastic force against the driving gear 230 in the direction of facing the detent member 220. Accordingly, the driving gear 230 may be in contact with the detent member 220 by the elastic force of the elastic member 250.

The motor support 260 may support the driving motor 270. Since the driving motor 270 is supported by the motor support 260, the position of the driving motor 270 may be fixed to the drive body 210. The driving motor 270 may generate the driving force and rotate the drive body 210 with respect to the fixing member 300. When the drive body 210 rotates with respect to the fixing member 300, the mirror housing 12 may rotate with respect to the mirror base 11.

Figure 24:
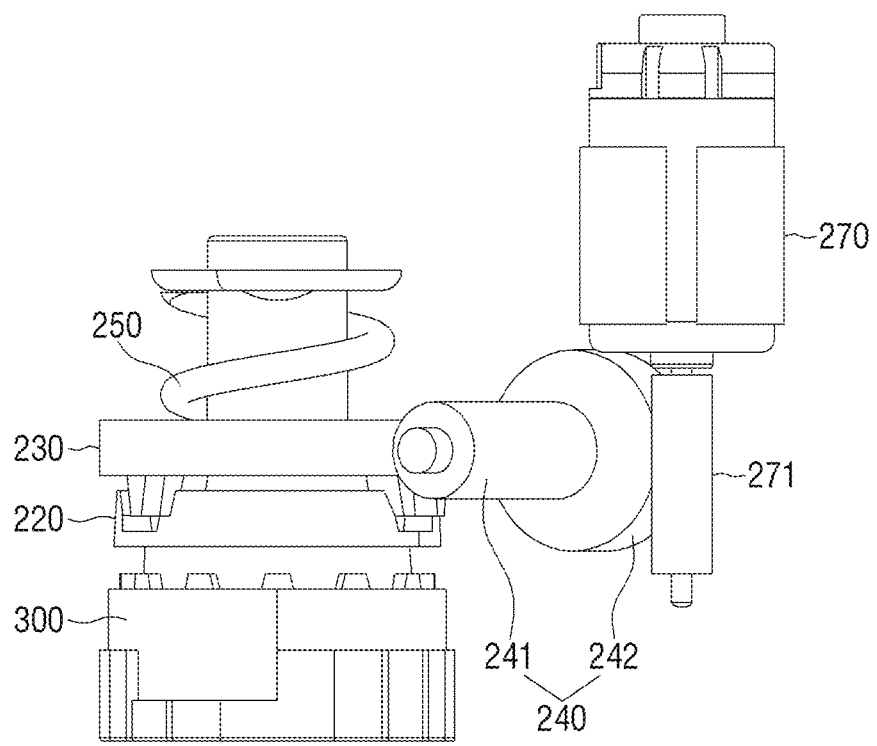
FIG. 24 depicts a driving force of a driving motor being transmitted to the driving gear in the driving apparatus according to an embodiment of the present disclosure.

FIG. 24 depicts the driving force of the driving motor 270 being transmitted to the driving gear 230. Referring to FIG. 24, the driving force of the driving motor 270 may be transmitted to the driving gear 230 through the transmission gear 240.

The transmission gear 240 may include a first transmission gear 241 and a second transmission gear 242. The first transmission gear 241 and the second transmission gear 242 may have the same rotation axis and may be fixed to each other. The first transmission gear 241 may be provided in the form of a worm screw, while the second transmission gear 242 may be provided in the form of a worm gear.

In the present disclosure, the driving gear 230 may be provided in the form of a worm gear. In addition, the pinion gear 271 of the driving motor 270 may be provided in the form of a worm screw. Accordingly, the first transmission gear 241 may be coupled to the driving gear 230, and the second transmission gear 242 may be coupled to the pinion gear 271. The present disclosure, however, is not limited such a configuration, and depending on the orientation of the driving motor 270, a person of ordinary skill in the art may variously implement appropriate gear systems to transfer the driving force generated from the driving motor 270 to the driving gear 230.

The driving force of the driving motor 270 may be transmitted to the driving gear 230 through the pinion gear 271, the second transmission gear 242, and the first transmission gear 241. The driving gear 230 that receives the driving force may rotate with respect to the detent member 220 or may be locked to the detent member 220. When the driving gear 230 is locked to the detent member 220, a rotational force of the driving motor 270 may be used to rotate the drive body 210 with respect to the driving gear 230.

Figure 25:
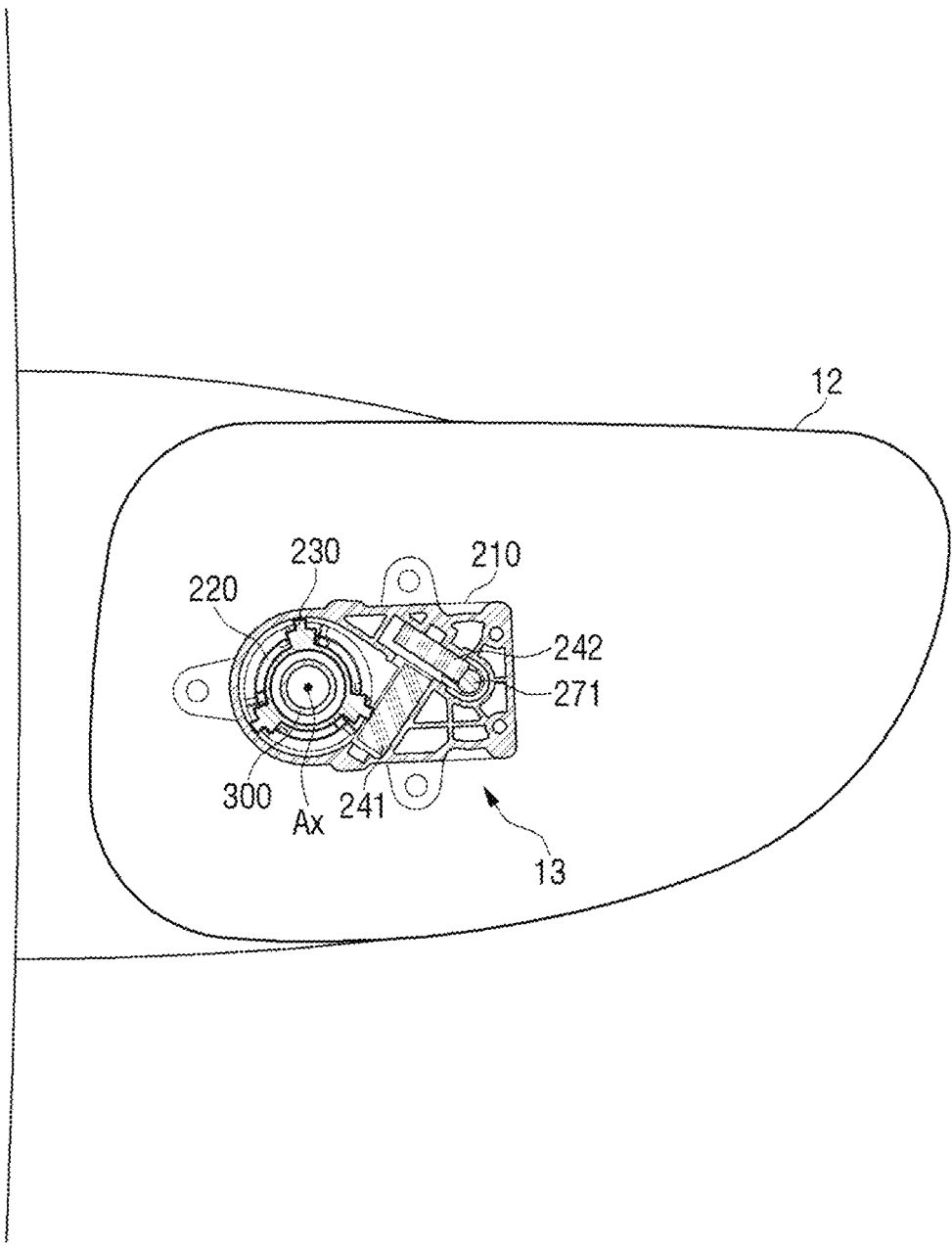
FIG. 25 depicts a first position of the mirror housing with respect to the mirror base.
Figure 26:
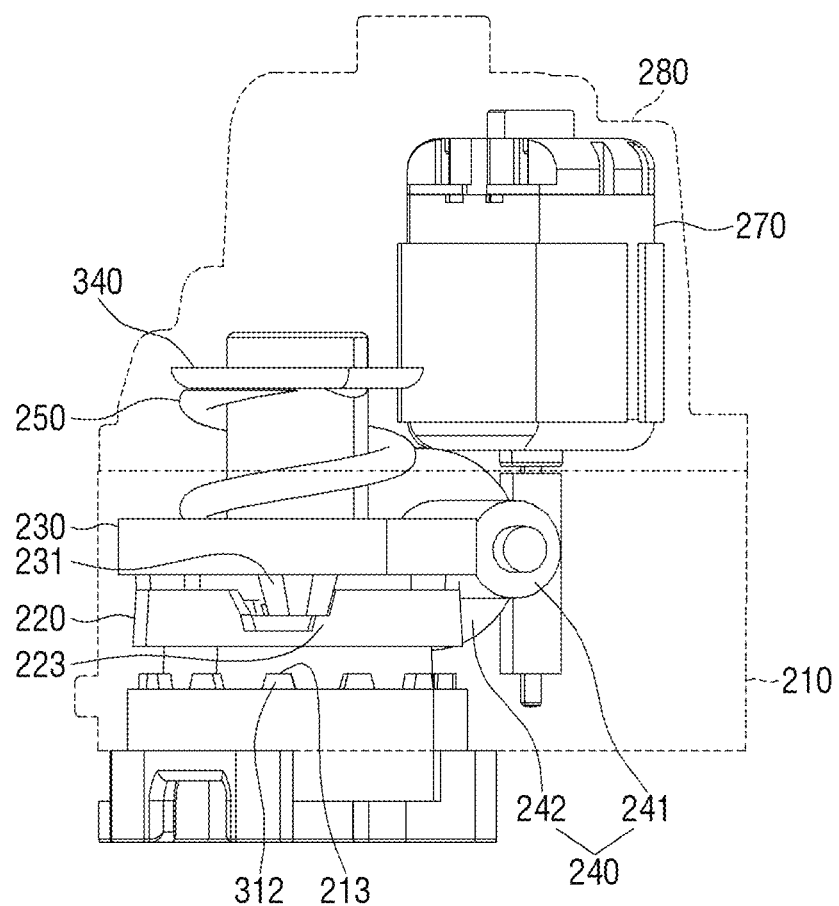
FIG. 26 illustrates the inside of the driving member when the mirror housing is in the first position.
Figure 27:
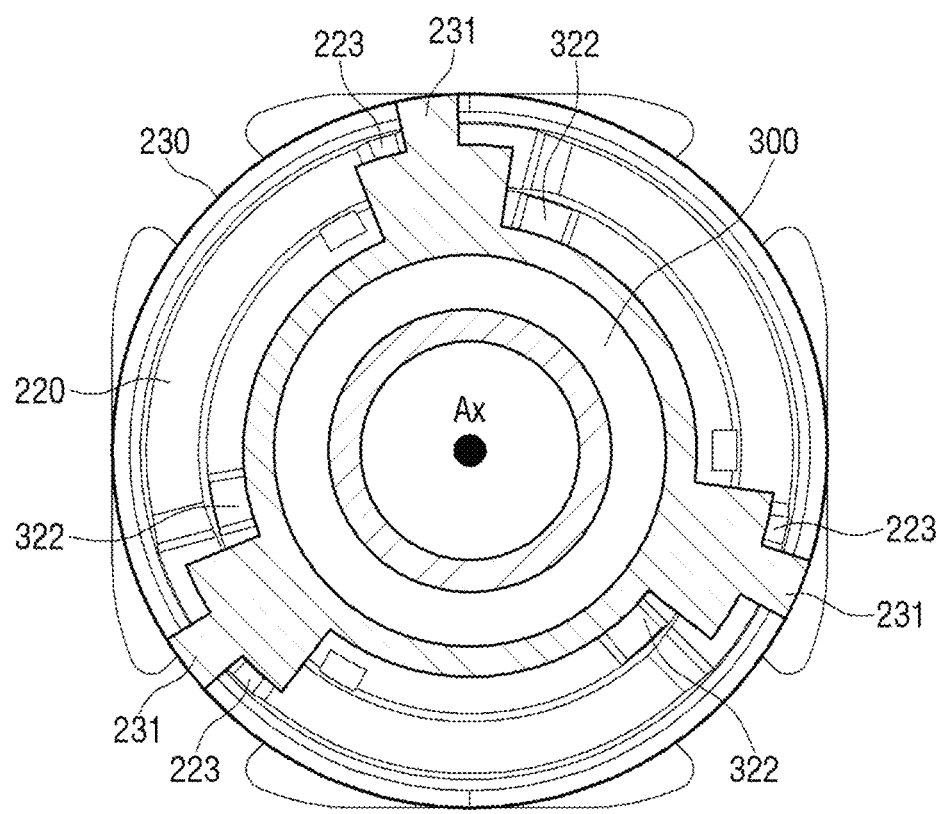
FIG. 27 depicts a relationship between the driving gear and the detent member when the mirror housing is in the first position.
Figure 32:
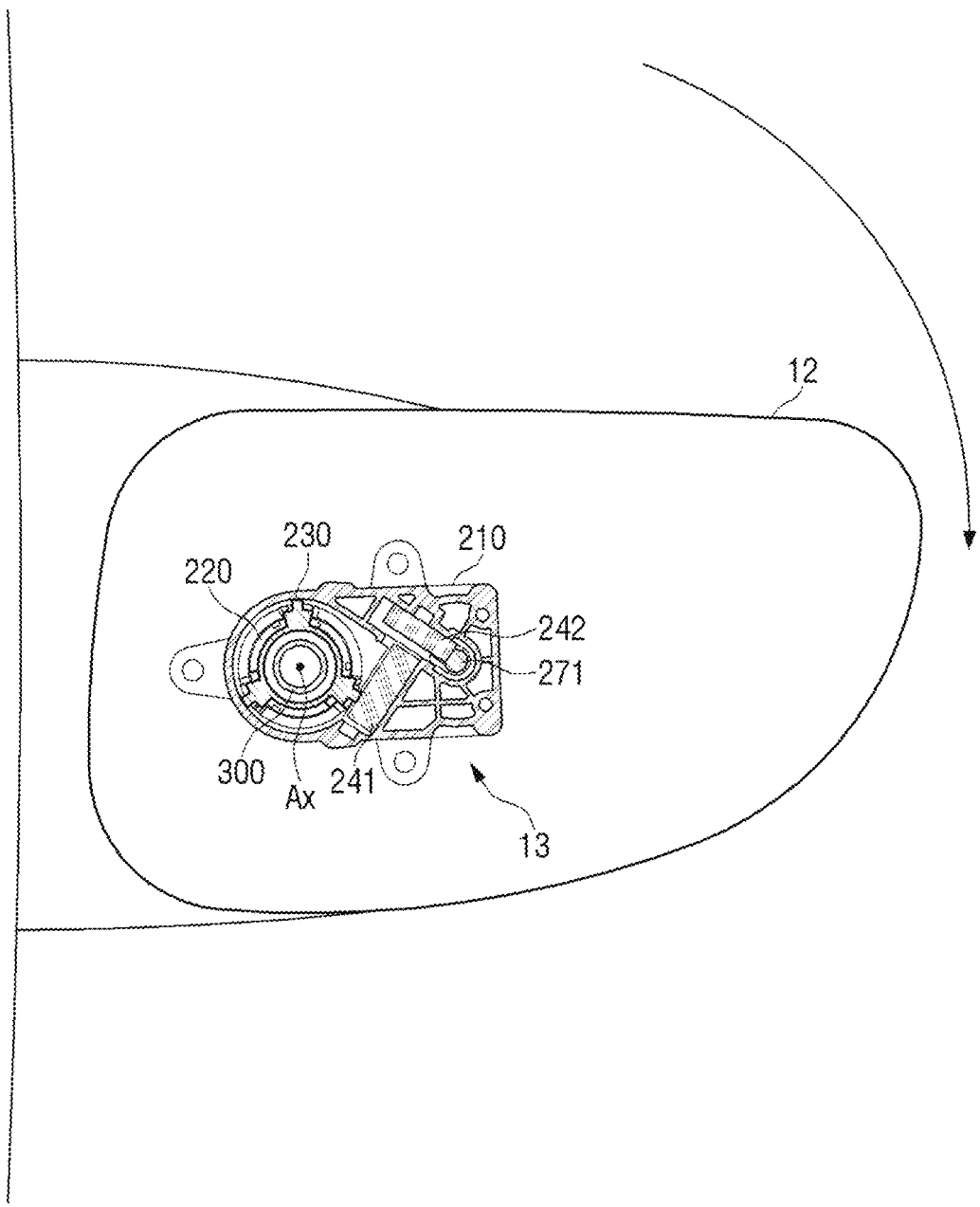
FIG. 32 depicts the position of the mirror housing with respect to the mirror base being changed from the second position to the first position.

FIG. 25 depicts the first position of the mirror housing 12 with respect to the mirror base 11, FIG. 26 illustrates the inside of the driving member 200 when the mirror housing is in the first position, FIG. 27 depicts a relationship between the driving gear 230 and the detent member 220 when the mirror housing 12 is in the first position, and FIG. 32 depicts the position of the mirror housing 12 with respect to the mirror base 11 being changed from the second position to the first position.

Referring to FIGS. 25 to 27, the detent protrusion 231 of the driving gear 230 may be supported by the protrusion support 223 of the detent member 220 in the first position of the mirror housing 12. When the detent protrusion 231 is supported by the protrusion support 223, the elastic force of the elastic member 250 may be transmitted to the mirror housing 12 through the detent member 220 and the drive body 210, and thus may act as a force to maintain the mirror housing 12 proximate to the mirror base 11.

Specifically, the elastic member 250 may provide the elastic force to the driving gear 230 in a state where the elastic member 250 is supported by an elastic support 340 fixed to the fixing member 300. Accordingly, the driving gear 230 may be pressed in the direction toward the detent member 220 by the elastic force of the elastic member 250. When the detent protrusion 231 of the driving gear 230 presses the protrusion support 223, the support protrusion 312 of the fixing member 300 may be inserted into the support groove 213 of the drive body 210. In such case, the mirror housing 12 may be disposed proximate to the mirror base 11 at the preset reference interval. The first position of the mirror housing 12 may be a position of the mirror housing 12 during driving. As the mirror housing 12 is disposed proximate to the mirror base 11, the wind noise can be prevented or reduced.

Figure 28:
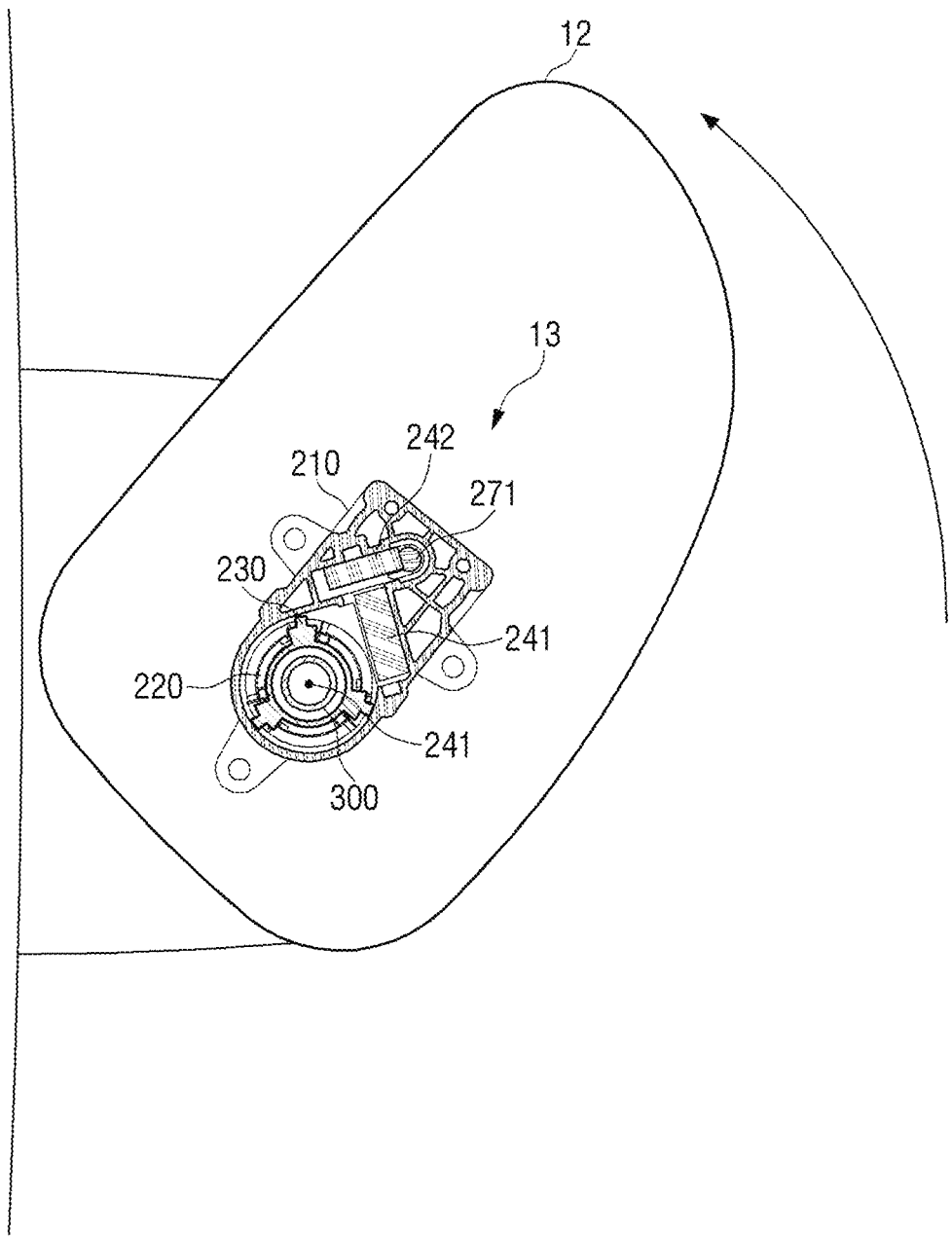
FIG. 28 depicts the position of the mirror housing with respect to the mirror base being changed from the first position to a second position.
Figure 29:
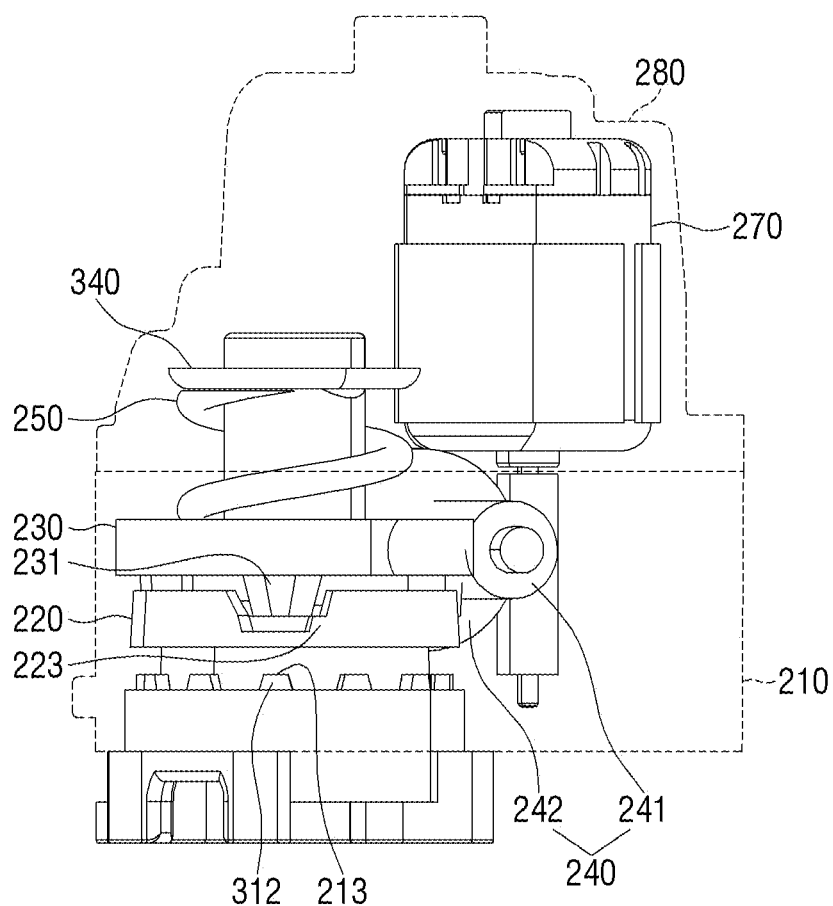
FIG. 29 depicts the support of the detent protrusion being released from a protrusion support in the driving apparatus according to an embodiment of the present disclosure.
Figure 30:
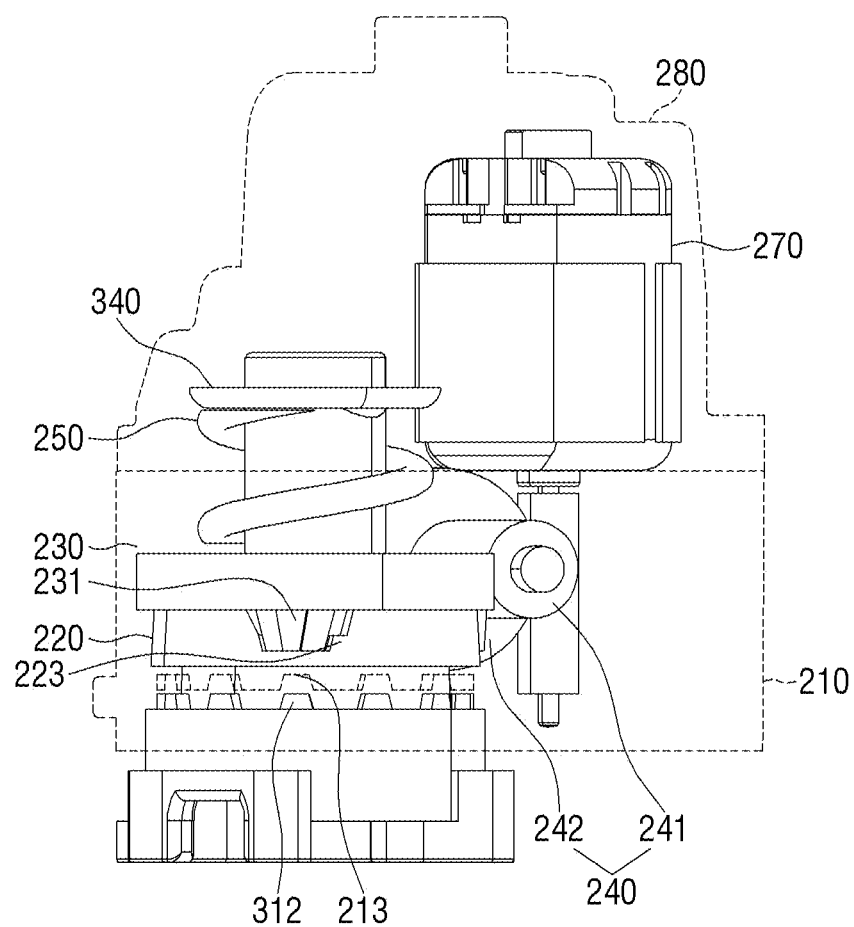
FIG. 30 depicts the detent protrusion being supported by a bottom surface of a detent groove in the driving apparatus according to an embodiment of the present disclosure.
Figure 31:
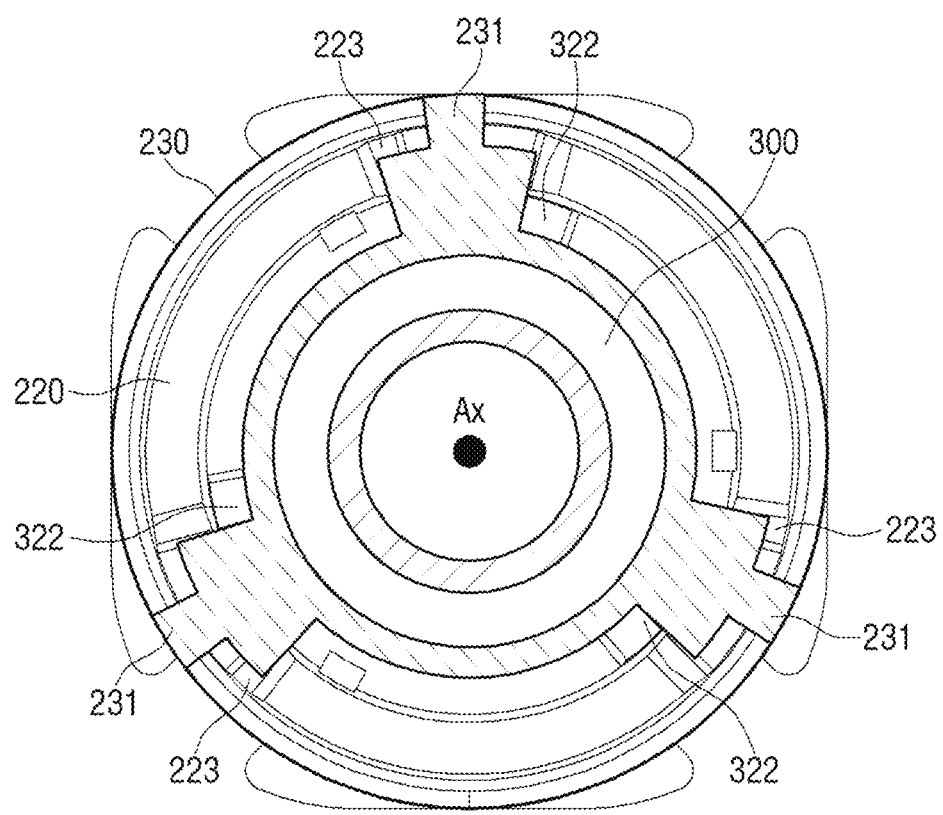
FIG. 31 depicts the detent protrusion abutting a guide inclined surface and a rotation blocking member in the driving apparatus according to an embodiment of the present disclosure.

FIG. 28 depicts the position of the mirror housing 12 with respect to the mirror base 11 being changed from the first position to the second position, FIG. 29 illustrates the support of the detent protrusion 231 being released from the protrusion support 223, FIG. 30 depicts the detent protrusion 231 supported by the bottom surface of the detent groove 222, and FIG. 31 depicts the detent protrusion 231 abutting the guide inclined surface 222*a* and 222*b* and the rotation blocking member 322.

Referring to FIGS. 28 to 31, the position of the mirror housing 12 may be changed from the first position to the second position. The position change of the mirror housing 12 may be performed by the driving force of the driving motor 270. When the driving motor 270 generates the driving force, the driving gear 230 may be rotated. When the driving gear 230 rotates, as illustrated in FIG. 29, the support of the detent protrusion 231 may be released from the protrusion support 223.

With the support of the detent protrusion 231 released (e.g., having fell) from the protrusion support 223, the driving gear 230 may continue to rotate. As illustrated in FIGS. 30 and 31, the detent protrusion 231 may move while being supported by the bottom surface of the detent groove 222 and may abut the guide inclined surfaces 222*a* and 222*b* of the detent groove 222, and the rotation blocking member 322 of the fixing member 300.

In a state that the detent protrusion 231 abuts the rotation blocking member 322 and the driving gear 230 is blocked from rotating with respect to the fixing member 300, the driving force of the driving motor 270 may act as a torque that rotates the drive body 210 with respect to the driving gear 230. More specifically, while the detent protrusion 231 is in contact with the guide inclined surfaces 222*a* and 222*b* of the detent groove 222 and the rotation blocking member 322 of the fixing member 300, the driving force of the driving motor 270 may be transmitted to the driving gear 230. In such case, since the driving gear 230 is blocked from rotating with respect to the detent member 220 and the fixing member 300, the drive body 210 may rotate with respect to the driving gear 230.

When the drive body 210 rotates with respect to the driving gear 230, the support protrusion 312 of the fixing member 300 may be dislodged from the support groove 213 of the drive body 210. In other words, as the support protrusion inclined surface 312*a* is dislodged from the support groove inclined surface 213*a*, the drive body 210 may ascend along the support protrusion 312. When the drive body 210 ascends along the support protrusion 312, the distance between the mirror base 11 and the mirror housing 12 may increase. Since the mirror housing 12 rotates with respect to the mirror base 11 in a state where a predetermined distance is maintained between the mirror base 11 and the mirror housing 12, the abrasion between the mirror base 11 and the mirror housing 12 may be prevented.

In the present disclosure, the height of the protrusion support 223 from the bottom surface of the detent groove 222 may be substantially equal to or greater than the height of the support protrusion 312 from the seating surface 311 of the fixing member 300. While the support of the detent protrusion 231 is released from the protrusion support 223 and the detent protrusion 231 is supported by the bottom surface of the detent groove 222, the detent member 220 may ascend by the height of the protrusion support 223. In turn, the drive body 210 may move along the support protrusion inclined surface 312*a* and ascend to the top of the support protrusion 312. Since the height of the protrusion support 223 is equal to or greater than the height of the support protrusion 312, the drive body 210 and the detent member 220 may be simultaneously ascended by the corresponding height, and the driving gear 230 may maintain its position. With the maintenance of the position of the driving gear 230, the elastic force of the elastic member 250 may stay constant, and the driving gear 230 may press the detent member 220 with a constant force.

Figure 33:
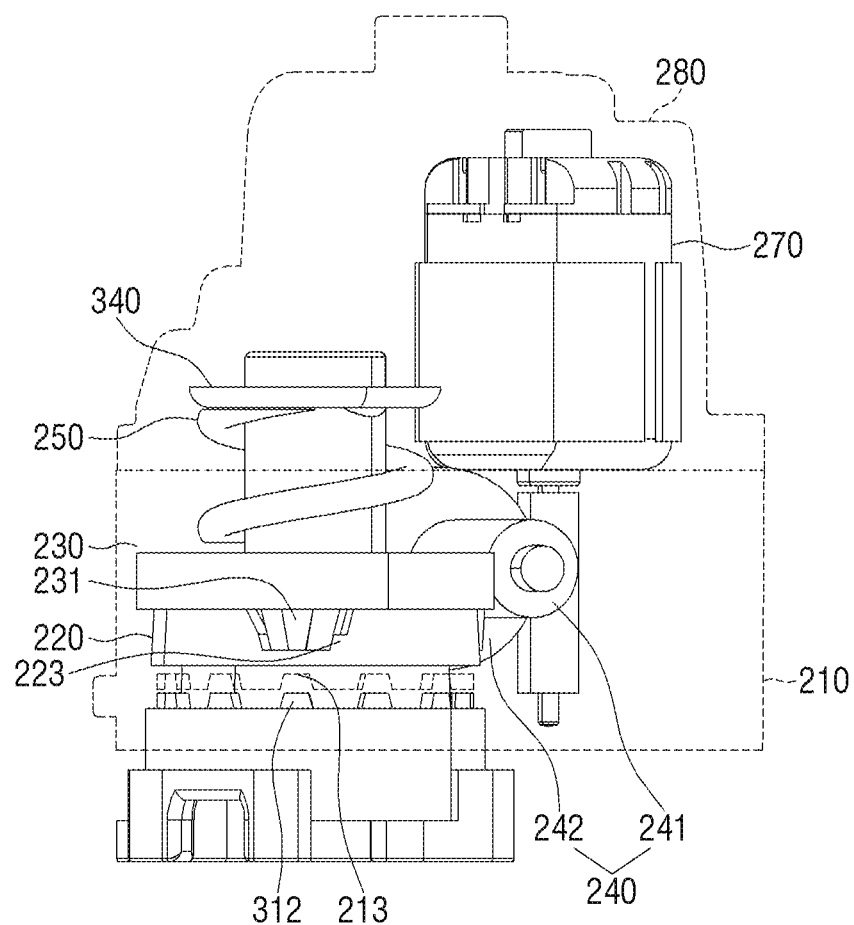
FIG. 33 depicts the detent protrusion abutting the support inclined surface of the detent groove in the driving apparatus according to an embodiment of the present disclosure.
Figure 34:
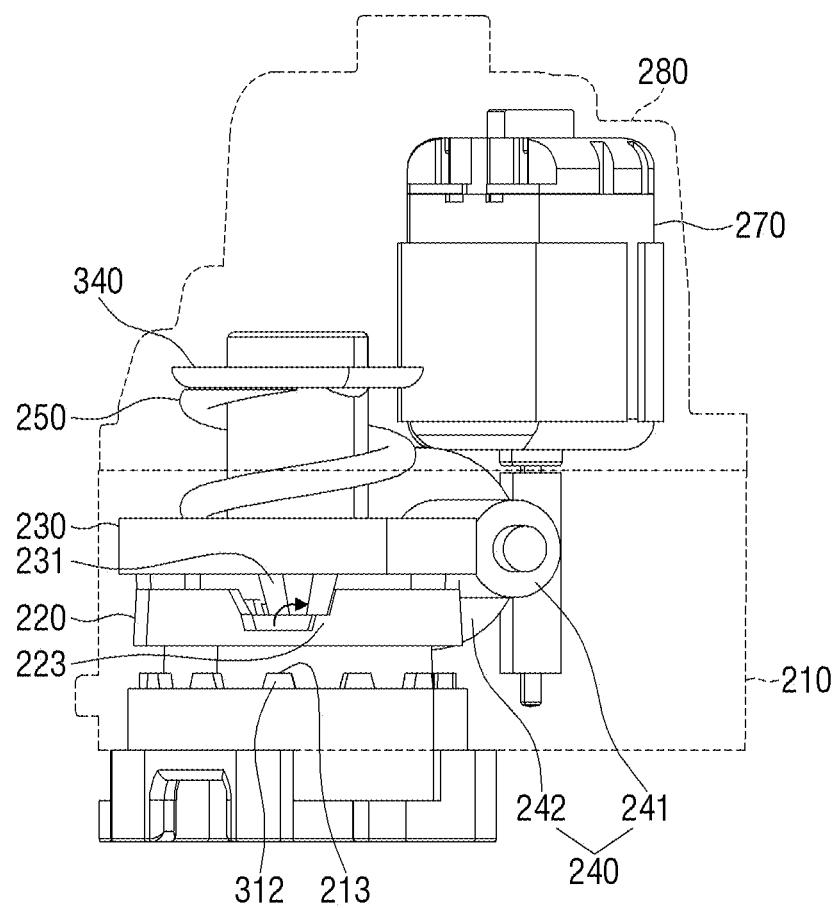
FIG. 34 depicts the detent protrusion being supported by the protrusion support of the detent groove in the driving apparatus according to an embodiment of the present disclosure.

FIG. 32 depicts the position of the mirror housing 12 with respect to the mirror base 11 being changed from the second position to the first position, FIG. 33 illustrates the detent protrusion 231 abutting the support inclined surface 222*c* of the detent groove 222, and FIG. 34 illustrates the detent protrusion being supported by the protrusion support 223 of the detent groove 222.

Referring to FIGS. 32 to 34, the position of the mirror housing 12 may be changed from the second position to the first position. The position change of the mirror housing 12 may be performed by the driving force of the driving motor 270. When the driving motor 270 generates the driving force, the driving gear 230 may rotate. When the driving gear 230 rotates, the detent protrusion 231 of the driving gear 230 may be in contact with the first support inclined surface 222c of the detent member 220. While the detent protrusion 231 abuts the first support inclined surface 222c, the driving force of the driving motor 270 may be continued to be transmitted to the driving gear 230. In such case, since the driving gear 230 is blocked from rotating with respect to the detent member 220, the drive body 210 may rotate with respect to the driving gear 230.

The rotation of the drive body 210 may be continued until the cover protrusion 110 of the main cover 100 abuts the rotation blocking surface 411 of the base cover 400. When the cover protrusion 110 is in contact with the rotation blocking surface 411, the drive body 210 may be blocked from rotating with respect to the mirror base 11. As the driving force of the driving motor 270 is transmitted to the driving gear 230 in this state, as illustrated in FIG. 34, the detent protrusion 231 may move along the first support inclined surface 222c and ascend to the top of the protrusion support 223, and the driving gear 230 may rotate slightly with respect to the fixing member 300. As the detent protrusion 231 ascends to an upper surface of the protrusion support 223, the position change of the mirror housing 12 to the first position may be completed.

Figure 35:
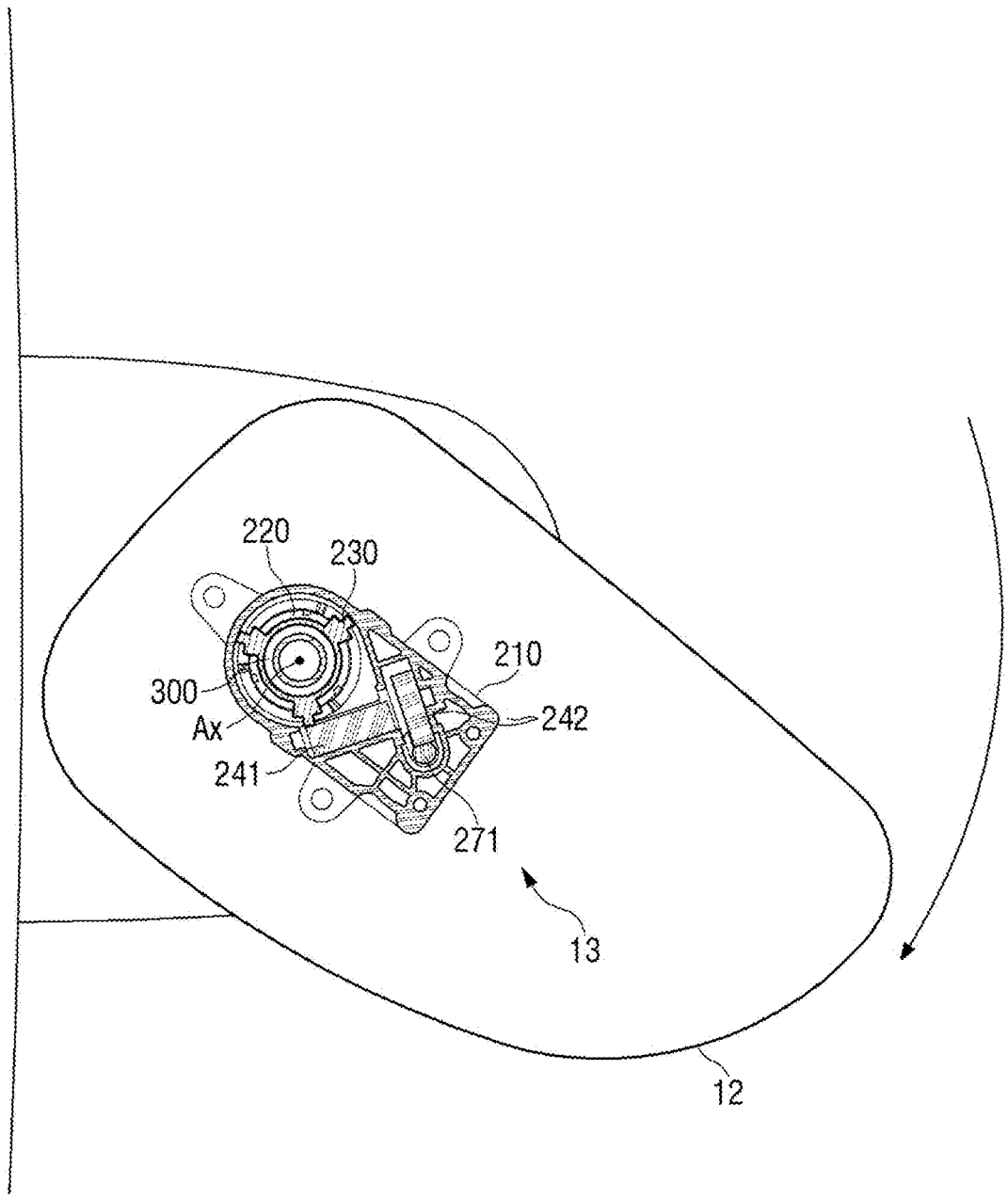
FIG. 35 depicts the position of the mirror housing with respect to the mirror base being changed from the first position to a third position.
Figure 36:
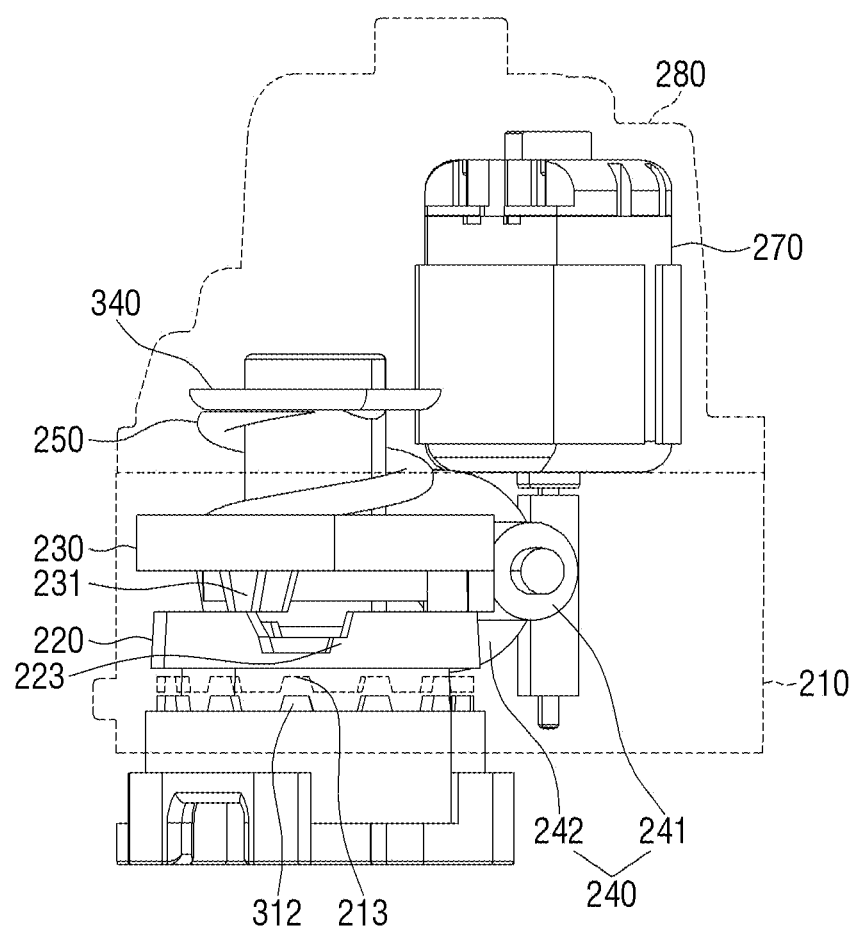
FIG. 36 depicts the detent protrusion being moved to an upper surface of the detent member in the driving apparatus according to an embodiment of the present disclosure.
Figure 37:
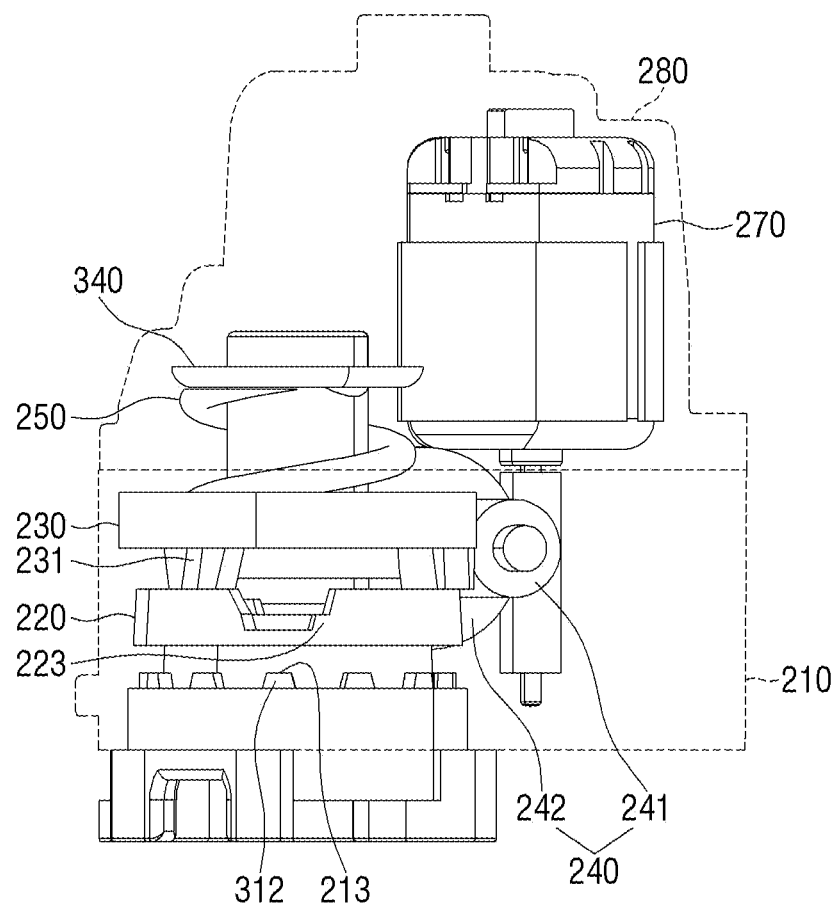
FIG. 37 depicts the detent member being pressed by the driving gear in the driving apparatus according to an embodiment of the present disclosure.

FIG. 35 depicts the position of the mirror housing 12 with respect to the mirror base 11 being changed from the first position to the third position, FIG. 36 illustrates the detent protrusion 231 moving to an upper surface of the detent member 220, and FIG. 37 illustrates the detent member 220 being pressed by the driving gear 230.

Referring to FIGS. 35 to 37, the position the mirror housing 12 may be changed from the first position to the third position. When an external force rotating the drive body 210 with respect to the fixing member 300 is exerted on the drive body 210, the driving gear 230 may rotate together with the drive body 210, and accordingly, the detent protrusion 231 may move to the upper surface of the detent member 220 along the inclined surfaces of the rotation blocking member 322 and the detent groove 222.

When pedestrians, surrounding vehicles, or surrounding objects exert the external force on the mirror housing 12, the position of the mirror housing 12 may be changed from the first position toward or to the third position as illustrated in FIG. 35. The external force exerted on the mirror housing 12 may be transmitted to the drive body 210 through the main cover 100. In such case, the external force may act as a torque that rotates the drive body 210 with respect to the rotation axis Ax.

Meanwhile, the first transmission gear 241 may be rotatably coupled to the drive body 210 based on the rotation axis thereof, and may be gear-coupled to the driving gear 230. When the drive body 210 rotates about the rotation axis Ax of the mirror housing 12, as the driving gear 230 is pushed (or pulled) by the first transmission gear 241, the driving gear 230 may rotate together with the drive body 210 due to the unidirectional characteristics of the worm screw and worm gear configuration. The external force may be transmitted to the driving gear 230 through the first transmission gear 241, thus forcing the driving gear 230 to rotate.

As illustrated in FIG. 36, as the driving gear 230 rotates, the detent protrusion 231 of the driving gear 230 may move to the upper surface of the detent member 220 while ascending along the inclined surface of the rotation blocking member 322 and the guide inclined surfaces 222a and 222b of the detent member 220. Accordingly, when the position change of the mirror housing 12 to the third position is completed, the support protrusion 312 of the fixing member 300 may be inserted into the support groove 213 of the drive body 210, and the mirror housing 12 may be simultaneously disposed close to the mirror base 11.

Meanwhile, FIGS. 35 to 37 illustrate that the position of the mirror housing 12 is changed from the first position to the third position by the external force, but when the position of the mirror housing 12 is changed from the second position to the first position by the external force, the driving apparatus 13 may operate in a manner similar thereto.

Herein, the driving apparatus 13 has been described for one of the side mirrors of the vehicle. However, a person of ordinary skill in the art will understand that the driving apparatus 13 for the other side mirror may be similarly implemented primarily as a mirror image of the embodiment described throughout the specification.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. An apparatus for operating a mirror assembly of a vehicle, comprising:
   a fixing member fixed to a mirror base of the vehicle; and
   a driving member fixed to a mirror housing of the vehicle and configured to rotate the mirror housing with respect to the fixing member by generating a driving force,
   wherein a position of the mirror housing includes a first position where the mirror housing is unfolded with respect to the mirror base and a second position where the mirror housing is folded with respect to the mirror base,
   wherein the driving member is configured to:
      decrease a gap between the mirror housing and the mirror base when the mirror housing is changed from the second position to the first position; and
      increases the when the mirror housing is changed from the first position to the second position, and
   wherein the driving member comprises:
      a drive body coupled to the fixing member and fixed to the mirror housing;
      a driving motor for generating the driving force to rotate the drive body with respect to the fixing member;
      a detent member coupled to the fixing member to move in a direction parallel to a rotation axis of the mirror housing and prevented from rotating with respect to the fixing member, wherein the detent member includes at least one detent groove; and
      a driving gear disposed coaxially with the detent member along the direction parallel to the rotation axis of the mirror housing for receiving the driving force from the driving motor, wherein the driving gear includes at least one detent protrusion capable of being inserted into the detent groove.

2. The apparatus of claim 1, wherein a protrusion support is formed at a bottom corner of the detent groove and configured to support the detent protrusion in a state that the detent protrusion is separated from a bottom surface of the detent groove by a predetermined distance.

3. The apparatus of claim 2, wherein the detent protrusion is supported by the protrusion support by a rotation of the driving gear with respect to the detent member, or supported by the bottom surface of the detent groove when released from the protrusion support.

4. The apparatus of claim 2, wherein the driving member further comprises an elastic member configured to generate an elastic force to push the driving gear toward the detent member, and
wherein when the detent protrusion is supported by protrusion support, the elastic force of the elastic member is transmitted to the mirror housing through the detent member and the drive body and acts as a force to maintain the mirror housing proximate to the mirror base.

5. The apparatus of claim 1, wherein the detent groove includes a detent groove inclined surface, and the detent protrusion includes a detent protrusion inclined surface, and
wherein the detent groove inclined surface and the detent protrusion inclined surface face each other in a rotation direction of the driving gear, and each of the detent groove inclined surface and the detent protrusion inclined surface is inclined with respect to a longitudinal direction of the rotation axis of the mirror housing.

6. The apparatus of claim 5, wherein the detent groove inclined surface comprises:
a first guide inclined surface formed on a bottom surface of the detent groove by a predetermined height; and
a second guide inclined surface that extends from the first guide inclined surface to an upper surface of the detent member,
wherein an angle of the second guide inclined surface with respect to the bottom surface of the detent groove is greater than an angle of the first guide inclined surface with respect to the bottom surface of the detent groove.

7. The apparatus of claim 5, wherein when the driving motor generates the driving force while the detent groove inclined surface and the detent protrusion inclined surface abut each other, the drive body rotates with respect to the driving gear.

8. The apparatus of claim 1, wherein the detent protrusion of the driving gear includes a plurality of detent protrusions,
wherein the plurality of detent protrusions are disposed so that distances between adjacent detent protrusions are equal to one another along a circumferential direction of the driving gear, and
wherein the detent groove of the detent member includes a plurality of detent grooves, wherein the plurality of detent grooves are disposed at positions corresponding to the plurality of detent protrusions.

9. The apparatus of claim 1, wherein the driving gear is provided in a form of a worm gear, and the driving member further comprises a transmission gear configured to transmit the driving force of the driving motor to the driving gear, and
wherein the transmission gear includes a first transmission gear provided in a form of a worm screw and gear-coupled to the driving gear.

10. The apparatus of claim 1, wherein the fixing member includes a ring-shaped seating surface to allow the drive body to be seated thereon, and
wherein the seating surface includes at least one support protrusion that protrudes therefrom, and the drive body includes at least one support groove configured to be inserted into the support protrusion.

11. The apparatus of claim 10, wherein the support protrusion includes a support protrusion inclined surface, and the support groove includes a support groove inclined surface, and
wherein the support protrusion inclined surface and the support groove inclined support face each other in a rotation direction of the drive body, and each of the support protrusion inclined surface and the support groove inclined support is inclined with respect to a longitudinal direction of the rotation axis of the mirror housing.

12. The apparatus of claim 10, wherein a protrusion support is formed at a bottom corner of the detent groove and configured to support the detent protrusion in a state that the detent protrusion is separated from a bottom surface of the detent groove by a predetermined distance, and
wherein a height of the protrusion support from the bottom surface of the detent groove is substantially equal to a height of the support protrusion from the seating surface.

13. The apparatus of claim 1, the fixing member comprises:
a rotation blocking member disposed on a rotation path of the detent protrusion and configured to obstruct the driving gear from rotating with respect to the fixing member in response to the rotation blocking member abutting the detent protrusion.

14. The apparatus of claim 13, wherein in a state that the detent protrusion abuts the rotation blocking member and the driving gear is obstructed from rotating with respect to the fixing member, the driving force of the driving motor acts as a torque that rotates the drive body with respect to the driving gear.

15. The apparatus of claim 13, wherein in response to an external torque being exerted to rotate the drive body with respect to the fixing member, the driving gear is configured to rotate together with the drive body, and the detent protrusion moves to an upper surface of the detent member along inclined surfaces of the rotation blocking member and the detent groove.

16. The apparatus of claim 1, wherein the mirror housing comprises at least one of a mirror configured to provide reflective images of side and rear of the vehicle or an imaging device configured to generate photographed images of the side and rear of the vehicle.

* * * * *